United States Patent [19]
Hara

[11] Patent Number: 6,044,055
[45] Date of Patent: Mar. 28, 2000

[54] PHASE CHANGE RECORDING APPARATUS HAVING FRONT AND REAR PULSE CHANGING MEANS

[75] Inventor: Masaaki Hara, Kanagawa, Japan

[73] Assignee: Sony Corporation, Tokyo, Japan

[21] Appl. No.: 08/932,069

[22] Filed: Sep. 17, 1997

[30] Foreign Application Priority Data

Sep. 18, 1996 [JP] Japan ................................. 8-245879

[51] Int. Cl.$^7$ ...................................................... G11B 7/09
[52] U.S. Cl. ............................ 369/116; 369/59; 369/124
[58] Field of Search ............................. 369/13, 116, 47, 369/59, 57, 124, 54, 100, 283, 288

[56] References Cited

U.S. PATENT DOCUMENTS

| | | | |
|---|---|---|---|
| 5,150,351 | 9/1992 | Ohno et al. | 369/116 |
| 5,291,470 | 3/1994 | Nishiuchi et al. | 369/100 |
| 5,347,505 | 9/1994 | Moritsugu et al. | 369/59 |
| 5,367,514 | 11/1994 | Kobayashi et al. | 369/116 X |
| 5,412,626 | 5/1995 | Ohno et al. | 369/13 |
| 5,798,996 | 8/1998 | Arai | 369/59 |
| 5,802,032 | 9/1998 | Jacobs et al. | 369/59 |
| 5,848,043 | 12/1998 | Takada et al. | 369/116 |

*Primary Examiner*—Tan Dinh
*Assistant Examiner*—Kim-Kwok Chu
*Attorney, Agent, or Firm*—Frommer Lawrence & Haug, LLP.; William S. Frommer

[57] ABSTRACT

Where data are recorded onto a phase-change disk according to the MCAV (modified constant angular velocity) scheme to enable high-density recording and high-speed random access, marks and spaces are formed by using recording pulses having a front end pulse and a rear end pulse that are delayed so as to be suited to each of a low linear velocity zone and a high linear velocity zone. This is done by changing the pulse widths of the front end pulse and the rear end pulse by varying the positions of the rising edge and the falling edge of the front end pulse and the rear end pulse, respectively, that constitute the recording pulses. Thus, recording compensation suitable for each linear velocity is effected.

14 Claims, 13 Drawing Sheets

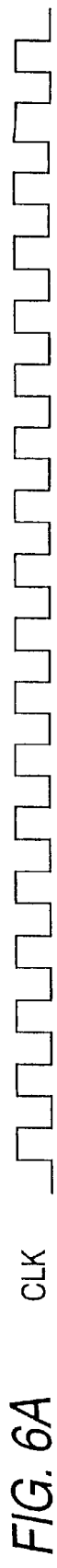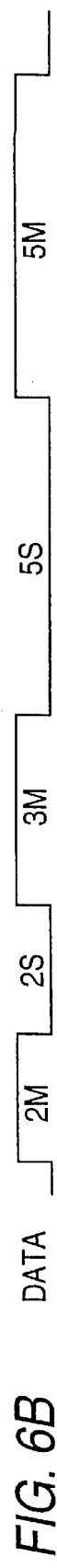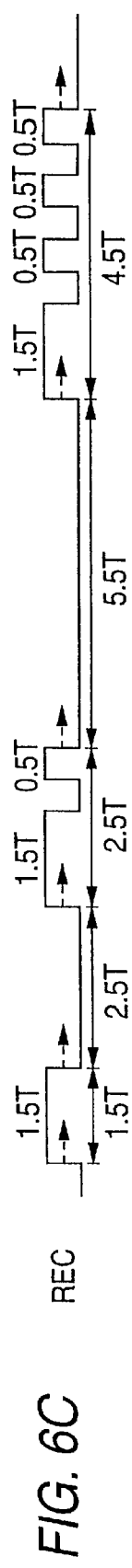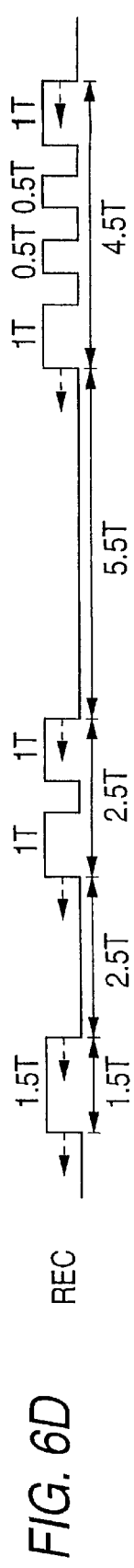
FIG. 6A  CLK
FIG. 6B  DATA
FIG. 6C  REC
FIG. 6D  REC

FCOUT = D [0] & D [1] & !D [2] & !D [3]
RCOUT = !D [0] & !D [1] & D [2] & D [3]

OEOUT = CSIN & !OWIN
CSOUT = CSIN | CWIN
WROUT = WRIN & !OWIN

TOP = DATA [k] & !DATA [k − 1]
END = DATA [k] & !DATA [k + 1]
MP = TOP | END | CLK

Q1 = DATA [k − 1/2]
Q2 = DATA [k]

16

REC = DD1 & DD2 & MP

21

82

85

PHASE CHANGE RECORDING APPARATUS HAVING FRONT AND REAR PULSE CHANGING MEANS

BACKGROUND OF THE INVENTION

The present invention relates to a data recording apparatus and method and a recording medium. In particular, the invention relates to a data recording apparatus and method suitable for recording data onto a recording medium such as a phase-change disk by forming marks and spaces thereon, as well as to such a recording medium.

The phase-change disk now attracts much attention as a next-generation high-density recording medium. Information recording onto a phase-change disk is performed by utilizing the property (phase change) of a recording film that it is rendered in an amorphous state when heated to a given temperature (for instance, about 600° C.) higher than the melting point and then rapidly cooled and is recrystallized when heated to a temperature (for instance, about 400° C.) lower than the melting point and then slowly cooled, as shown in FIG. 1. Recorded information is reproduced by utilizing the fact that the reflectance of light in the amorphous state is different than in the crystal state. An amorphous portion and a crystal portion are usually called a mark and a space, respectively. Thus, it can be said that information recording onto a phase-change disk is performed by forming thereon marks and spaces that correspond to information.

Incidentally, as for the magneto-optical disk as typified by Mini-Disc (trademark), the magnetic modulation scheme enables direct overwriting but is hard to provide high-speed recording and reproduction. On the other hand, although the optical modulation scheme enables high-speed recording and reproduction, to realize direct overwriting it requires use of a special recording film.

In contrast, with the phase-change disk, direct overwriting in which erasure of recorded data and recording of new data are effected simultaneously can easily be realized by forming marks and spaces while switching between medium power (erasing level) and high power (recording level, i.e., writing level) as shown in FIG. 2. Recorded data are reproduced by illuminating the disk with laser light of such low power (reproduction level) that no phase changes occur in a recording film. More specifically, based on the fact that marks in the amorphous state have a small reflectance while spaces in the crystal state have a large reflectance, data are reproduced by using differences in the quantity of reflection light that is obtained by illuminating the disk with laser light.

In addition to the above-mentioned advantage that direct overwriting can easily be realized, the phase-change disk are advantageous over the magneto-optical disk in the following points. These advantages are favorable for increasing the recording density.

(1) The structure of a pickup (optical pickup) can be made simple.

(2) A reproduction signal has a large amplitude and a large C/N ratio (carrier to noise ratio).

(3) Since a recording layer has small heat conductivity and a high erasing temperature, marks on adjacent tracks hardly influence each other and hence a high track density can be attained.

(4) It is possible to obtain high signal intensity from minute marks by reproducing data by utilizing not only a difference in reflectance but also a difference between phases of reflection light beams.

The data recording onto the phase-change disk is purely thermal recording. Therefore, to realize high-density recording, the heat management during data recording and erasure is most important.

As for the data recording scheme for the phase-change disk, the mark edge recording scheme is known in which marks and spaces of various lengths are formed and information is allocated to lengths of both marks and spaces. In the mark edge recording scheme, there may occur a case that laser light of the recording level is applied for a long time to form a relatively long mark. In such a case, due to the heat accumulation effect of a recording film, a tear-shaped mark is formed which is thicker in the disk radial direction in the latter half portion. Since the rear edges of such tearshaped marks are deviated from the ideal positions, the error rate becomes high when they are reproduced.

There is known a recording scheme A in which to prevent the radial width of a mark from increasing in its latter half portion, the illumination light quantity is reduced for the latter half portion by multipulse-driving a light-emitting means such as a laser diode that emits laser light.

In the recording scheme A, with an assumption that T represents a pulse width corresponding to one clock (data rate) as shown in FIG. 3A, a mark having a length nT (n: integer) is formed by driving a laser diode with a signal A that is expressed by Equation (1). (In the following, a signal for driving a light-emitting means such as a laser diode is referred to as recording pulses, where appropriate.)

$$A=1.5M+(n-2)(0.5S+0.5M)+0.5S \qquad (1)$$

where M means a H-level portion having a length T and S means a L-level portion having a length T. (Conversely, M and S may be made to correspond to the L-level and the H-level, respectively.)

Thus, for example, when data (see FIG. 3B) is 2M, that is, when n=2, according to Equation (1) the laser diode is driven with recording pulses A of 1.5M+0.5S, i.e., a H-level (recording level) portion of 1.5T and a L-level (erasing level) portion of 0.5T, as shown in FIG. 3C. When data (see FIG. 3B) is 3M. that is, when n=3, the laser diode is driven with recording pulses A of 1.5M+0.5S+0.5M+0.5S as shown in FIG. 3C. Similarly, when data (see FIG. 3B) is 5M, that is, when n=5, the laser diode is driven with recording pulses A of 1.5M+3(0.5S+0.5M)+0.5S (=1.5M+0.5S+0.5M+0.5S+0.5M+0.5S+0.5M+0.5S) as shown in FIG. 3C.

In the recording scheme A (and also in a recording scheme B (described later)), a recording pulse A corresponding to a portion nS of data is made nS.

However, the recording scheme A has a problem that the illumination light quantity becomes small at latter half portions of marks and a thermally unstable state occurs at their rear edges. In particular, when the linear velocity is high in the recording, the positions of the rear edges have remarkable variations.

To solve the above problem, a recording scheme B has been proposed in which a relatively large quantity of light is applied in forming the end portion of a mark, as disclosed in Furumiya et al., "Studies on a high recording rate, high-density recording scheme for phase-change disks," ITE Technical Report, Vol. 17, No. 79, pp. 7–12, VIR '93–83, December 1993 (hereinafter referred to as Reference 1), Japanese Unexamined Patent Publication No. Hei. 6-295440 (Reference 2), and Japanese Unexamined Patent Publication No. Hei. 7-129959 (Reference 3), for instance.

In the recording scheme B, a mark having a length nT is formed by driving a laser diode with recording signal (pulses) B that is represented by $$B=1.0M+(n-2)(0.5S+0.5M)+0.5M+0.5S. \qquad (2)$$

Therefore, for example, when data (see FIG. 3B) is 2M, that is, when n=2, according to Equation (2) the laser diode is driven with recording pulses B of 1.0M+0.5M+0.5S= 1.5M+0.5S as shown in FIG. 3D. When data (see FIG. 3B) is 3M, that is, when n=3, the laser diode is driven with recording pulses B of 1.0M+0.5S+0.5M+0.5M+0.5S= 1.0M+0.5S+1.0M+0.5S as shown in FIG. 3D. Similarly, when data (see FIG. 3B) is 5M, that is, when n=5, the laser diode is driven with recording pulses B of 1.0M+3(0.5S+ 0.5M)+0.5M+0.5S (=1.0M+0.5S+0.5M+0.5S+0.5M+0.5S+ 1.0M+0.5S) as shown in FIG. 3D.

However, even the recording scheme B has a problem that thermal interference occurs in portions where short marks and spaces such as those of 2T and 3T, in particular, between marks that are separated by a short space. As a result, edge positions are deviated from the ideal positions, which in turn increases the error rate.

To solve the above problem, References 1 and 3 disclose a recording compensation method in which recording is performed while edge positional deviations due to thermal interference etc. are compensated by detecting data corresponding to short marks and spaces and changing the positions of front edges and rear edges of recording pulses corresponding to such data.

FIG. 4 shows the configuration of an example of a conventional recording compensation circuit that performs the above type of recording compensation.

Modulated data (see FIG. 3B) obtained by modulating recording information are supplied to a front end pulse generator 101, a gate generator 102, a rear end pulse generator 103, and a mark/space length detector 104.

The modulated data are obtained by modulating information by combining (1, 7) RLL (run length limited) and NRZI (non-return-to-zero inverted), and hence do not include any isolated inversion. Further, the minimum inversion width and the maximum inversion width of the modulated data are 2 and 8, respectively (n is in a range of 2 to 8 in Equation (2)).

The front pulse generator 101 generates a front end pulse having a pulse width 1T (corresponding to the first term 1.0M of the right side of Equation (2)) that rises at a position delayed by 0.5T from the rising edge of each modulated data. The front end pulse is supplied to an OR gate 110 via a delay line 108.

The gate generator 102 generates, based on each modulated data, a gate signal whose pulse width corresponds to n in Equation (2), and supplies it to one input terminal of an AND gate 109. A clock signal (see FIG. 3A) is supplied to the other input terminal of the AND circuit 109. Thus, the AND circuit 109 calculates the logical product of the clock signal and the gate signal, thereby generating burst pulses, which correspond to a result obtained by deleting the last 0.5M from the second term (n−2)(0.5S+0.5M) of the right side of Equation (2). The burst pulses are supplied to the OR gate 110.

The rear end pulse generator 103 generates a rear end pulse having a pulse width 1T (corresponding to a combination of the last 0.5M of the second term (n−2)(0.5S+0.5M) and the third term 0.5M of the right side of Equation (2)) that falls in synchronism with the falling edge of each modulated data. The rear end pulse is supplied to the OR gate 110 via a delay line 107.

The OR gate 110 calculates the logical sum of the front end pulse, the burst pulses, and the rear end pulse, and thereby generates and outputs recording pulses B (see FIG. 3D) that are given by Equation (2).

On the other hand, the mark/space length detector 104 detects modulated data corresponding to short marks and spaces such as those of 2T and 3T, and supplies a detection result to selectors 105 and 106. Based on the detection result of the mark/space length detector 104, the selectors 105 and 106 determines delays to be applied to the front end pulse and the rear end pulse, respectively. The delay lines 108 and 107 are informed of the thus-determined delays.

The delay lines 108 and 107 output the front end pulse and the rear end pulse after delaying those by the delays the information of which has been given by the selectors 105 and 106, respectively.

In the above manner, recording compensation for edge positional deviations due to thermal interference etc. is effected by changing the positions of front end edges and rear end edges of recording pulses corresponding to data that correspond to short marks and spaces.

Incidentally, with the optical disk, the magneto-optical disk, and the like, data are recorded according to the CAV (constant angular velocity) scheme. In the CAV scheme, in which the angular velocity (disk rotation speed) is constant, the linear velocity is high on the disk inner side and low on the disk outer side if the data rate is constant. As a result, the total recording capacity is small.

On the other hand, where data are recorded according to the CLV (constant linear velocity) scheme, in which case the linear velocity is constant, the linear density is constant if the data rate is constant. As a result, the total recording capacity can be made large. However, the CLV scheme requires a complex control system because the rotation speed of a spindle motor for rotating a disk needs to be varied continuously over the entire disk from the innermost track to the outermost track.

In view of the above, the MCAV (modified CAV, or MZ-CAV (multi-zone CAV)) has been proposed which has both of the advantage of the CAV scheme (rotation driving at a constant angular velocity, i.e., simple control) and the advantage of the CLV scheme (large recording capacity).

In the MCAV scheme, rotation driving is performed at a constant linear velocity as in the case of the CAV scheme. However, a disk is divided into a certain number of (for example, about 50) zones from the innermost track to the outermost track, and recording is performed such that the data rate increases as the zone goes outward. The data rate is controlled so that the linear densities at the innermost tracks of the respective zones become identical. Thus, the recording capacity can be made large as in the case of the CLV scheme.

To realize high-density recording by using the phase-change disk, from the viewpoint of recording compensation it is preferable to employ the CLV scheme (linear velocity is constant) because recording compensation of fixed form can accommodate it. That is, since the data recording onto the phase-change disk is purely thermal recording, recording compensation of fixed form is sufficient if the linear velocity is constant.

However, in the CLV scheme, at the occurrence of a traverse (track jump), the disk rotation speed needs to be changed from a value suitable for a position before the traverse to a value suitable for a position after the traverse. Data reproduction cannot be restarted until the track rotation speed reaches the latter value. Although the random access capability is an important feature of disk-shaped recording media which feature is absent in tape-shaped media, the CLV scheme has a disadvantage of slow random access speed.

One way to prevent uses of the phase-change disk from being restricted by the above disadvantage is to employ the MCAV scheme which can provide large recording capacity and enables high-speed random access.

However, it is difficult for recording compensation of fixed form to accommodate the MCAV scheme because the linear velocity varies from the innermost track to the outermost track.

SUMMARY OF THE INVENTION

The present invention has been made in view of the above circumstances in the art, and an object of the invention is therefore to allow recording compensation to be performed easily in accordance with the linear velocity.

According to the invention, there is provided a data recording apparatus which records data onto a recording medium by using recording pulses that are a combination of a front end pulse, burst pulses, and a rear end pulse, comprising front end pulse changing means (for example, a multipulse generator 16, a programmable delay line 18, and a recording signal generator 21 shown in FIG. 7) for changing the pulse width of the front end pulse by changing the position of the front edge of the frond end pulse; and rear end pulse changing means (for example, the multipulse generator 16, a programmable delay line 17, and the recording signal generator 21 shown in FIG. 7) for changing the pulse width of the rear end pulse by changing the position of the rear edge of the rear end pulse.

The data recording apparatus may further comprise recording means (for example, a pickup 3 shown in FIG. 5) for recording the data by forming a mark and a space on the recording medium by using the recording pulses, wherein the front end pulse changing means and the rear end pulse changing means may change the position of the front edge and the position of the rear edge, respectively, based on the relative velocity between the recording means and the recording medium.

According to another aspect of the invention, there is provided a data recording apparatus which records data onto a recording medium by forming a mark and a space thereon by using recording pulses that correspond to the data, comprising front end pulse generating means (for example, DFFs (D-type flip-flops) 52 and 54 and an AND gate 56 shown in FIG. 11) for generating a front end pulse having a pulse width of one clock as a front end of the data; rear end pulse generating means (for example, DFFs 51 and 52 and an AND gate 57 shown in FIG. 11) for generating a rear end pulse having a pulse width of one clock as a rear end of the data; first delaying means (for example, a programmable delay line 18 shown in FIG. 11) for delaying the data by a first delay x; second delaying means (for example, a programmable delay line shown in FIG. 11) for delaying, by a second delay y, data that is advanced by a given number of clocks; and recording pulses composing means (for example, an OR gate 58 and AND gates 61 and 62 shown in FIG. 11) for composing the recording pulses by performing a logical operation on outputs of the front end pulse generating means, the rear end pulse generating means, and the first and second delaying means, wherein recording pulses corresponding to a mark having a length nT, where n is an integer and T is a pulse width corresponding to one clock, are represented by $$xS+(1.5-x)M+(n-2)(0.5S+0.5M)+yM+(0.5-y)S,$$

or $$xS+(1.5-x)M+(n-3)(0.5S+0.5M)+0.5S+yM+(1.0-y)S$$

where M represents one of a H-level portion having a length T and a L-level portion having a length T, and S represents the other.

In the above data recording apparatus, the recording pulses composing means may comprise first calculating means (for example, the OR gate 58 shown in FIG. 11) for calculating a logical sum of a clock signal and the outputs of the front end pulse generating means and the rear end pulse generating means; second calculating means (for example, the AND gate 61 shown in FIG. 11) for calculating a logical product of the outputs of the first and second delaying means; and third calculating means (for example, the AND gate 62 shown in FIG. 11) for calculating a logical product of the outputs of the first and second calculating means.

The data recording apparatus may further comprise delays setting means (for example, a microcomputer 11 shown in FIG. 11) for setting the first delay x and the second delay y adaptively.

The data recording apparatus according to claim 12, may further comprising recording means (for example, a pickup 3 shown in FIG. 5) for recording the data by forming a mark and a space on the recording medium by using the recording pulses, wherein the delays setting means may set the first delay x and the second delay y based on the relative velocity between the recording means and the recording medium.

The data recording apparatus may further comprise measuring means (for example, a DFF 81, a delay cell 82, an OR gate 83, selectors 84 and 86, a NOR gate 87, and RSFF (RS flip-flop) 88 shown in FIG. 14) for measuring the number of stages of inverters necessary for providing a given delay.

BRIEF DESCRIPTION OF THE DRAWINGS

FIGS. 6A–6D are waveform diagrams showing a recording compensation method used in a recording circuit 4 shown in FIG. 5;

DESCRIPTION OF THE PREFERRED EMBODIMENTS

Figure 5:
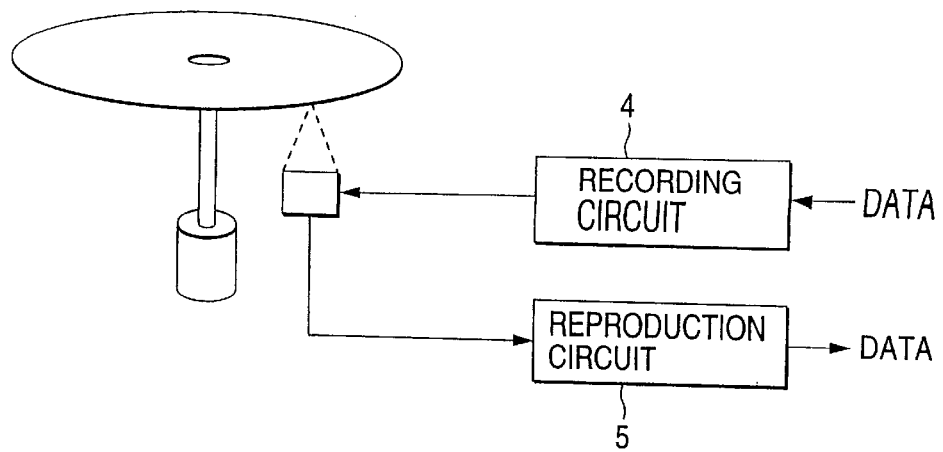
FIG. 5 is a block diagram showing the configuration of a disk drive according to an embodiment of the invention.

FIG. 5 shows the configuration of a disk drive according to an embodiment of the invention.

A disk 1, which is, for instance, a phase-change disk as described above, is rotated by a spindle motor 2. The spindle motor 2 constitutes a spindle servo system and rotates the disk 1 at a constant rotation speed (i.e., a constant number of revolutions per minute).

Figure 1:
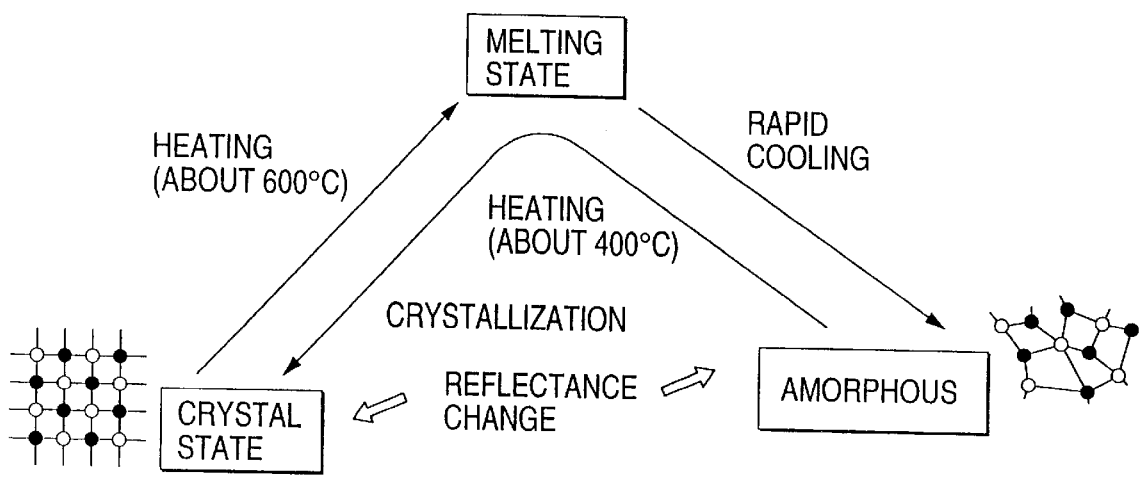
FIG. 1 illustrates the principle of recording with the phase-change disk.
Figure 2:
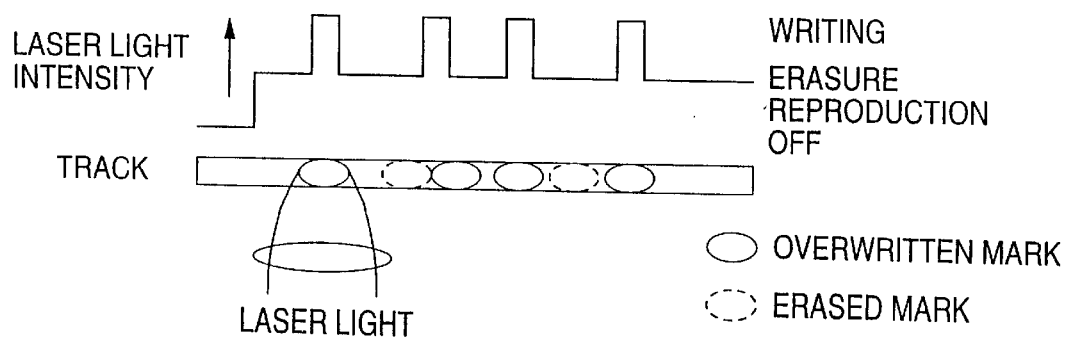
FIG. 2 illustrates direct overwriting.
Figure 3A:
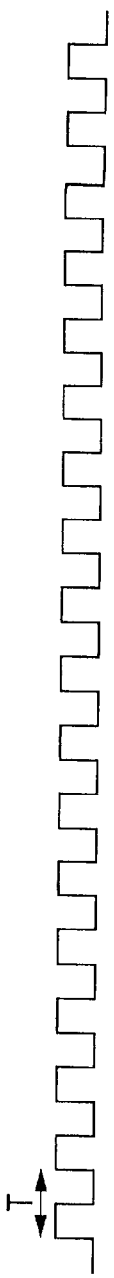
FIGS. 3A–3D are waveform diagrams showing conventional recording schemes.
Figure 3B:
Figure 3C:
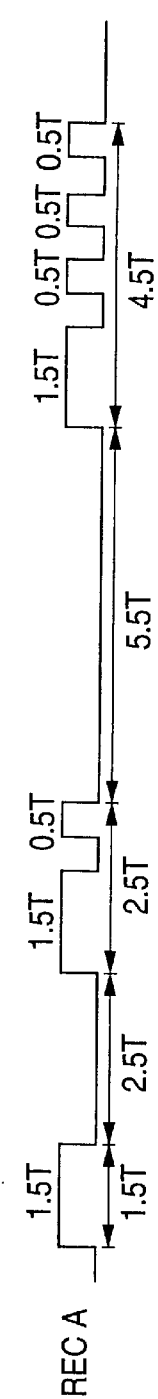
Figure 3D:
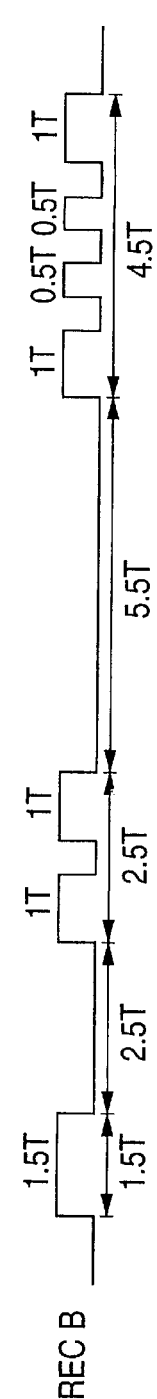

In data recording, modulated data that have been obtained, for instance, by subjecting data to be recorded to the above-mentioned modulation scheme that is a combination of (1, 7) RLL and NRZI are supplied to a recording circuit 4. The recording circuit 4 generates recording pulses that correspond to the modulated data and have been subjected to recording compensation. The recording pulses are supplied to a pickup 3. In the pickup 3, a light-emitting means such as a laser diode incorporated therein is driven in accordance with the recording pulses. As a result, laser light of the power as described in connection with FIG. 2 is applied to the disk 1 in accordance with the recording pulses, so that marks and spaces are formed so as to correspond to the data that were input to the recording circuit 4. Thus, the data are recorded according to the mark edge recording scheme, for instance.

On the other hand, in data reproduction, the pickup 3 applies laser light of the reproduction power level to the disk 1 and receives reflection light therefrom. Further, the pickup 3 photoelectrically converts the received reflection light and supplies a resulting RF (radio frequency) signal to a reproduction circuit 5. The reproduction circuit 5 performs predetermined processing on the RF signal to reproduce the modulation data, which are demodulated by a demodulation circuit (not shown) into the original data.

In this embodiment, for example, the entire area of the disk 1 from the innermost track to the outermost track is divided into a certain number (for instance, about 50) of zones, and recording is performed such that the data rate is increased as the zone goes outward. The data rate is controlled so that the linear densities at the innermost tracks of the respective zones become identical. Thus, in this embodiment, data are recorded onto and reproduced from the disk 1 according to the MCAV scheme.

Next, recording compensation performed in the recording circuit 4 of FIG. 5 will be described with reference to FIGS. 6A–6D.

FIGS. 6A–6D are waveform diagrams similar to those in FIGS. 3A–3D. According to the recording schemes A and B which are represented by Equations (1) and (2), respectively, when modulated data shown in FIG. 6B are given with a clock signal of FIG. 6A. recording pulses A and B shown in FIGS. 6C and 6D, respectively, are generated.

As described above, in the recording scheme A, edge positions of marks have remarkable variations when the linear velocity of the disk 1, i.e., the relative velocity between the disk 1 and the pickup 3, is high. On the other hand, when the linear velocity is low (for instance, about 4 m/s), such a phenomenon does not occur. Thus, the recording scheme A is suitable for low linear velocity driving. Conversely, although the recording scheme B is not suitable for low linear velocity driving, it is suitable for high linear velocity driving (for instance, about 10 m/s).

Therefore, where the linear velocity varies from a low speed to a high speed as the position goes from the innermost track to the outermost track as in the case of the MCAV scheme, recording compensation can be performed in accordance with the linear velocity by switching the recording pulses from those obtained by the recording scheme A to those obtained by the recording scheme B.

In the recording circuit 4, the widths of a front end pulse and a rear end pulse that constitute recording pulses A according to the recording scheme A are changed by changing the positions of the rising edge and the falling edge of the front end pulse and the rear end pulse, respectively, as indicated by broken line arrows in FIG. 6C. In this manner, the recording pulses A are varied in accordance with the linear velocity, for instance, in accordance with the zone. Further, the widths of a front end pulse and a rear end pulse that constitute recording pulses B according to the recording scheme B are changed by changing the positions of the rising edge and the falling edge of the front end pulse and the rear end pulse, respectively, as indicated by broken line arrows in FIG. 6D. In this manner, the recording pulses B are varied in accordance with the linear velocity, for instance, in accordance with the zone.

Figure 7:
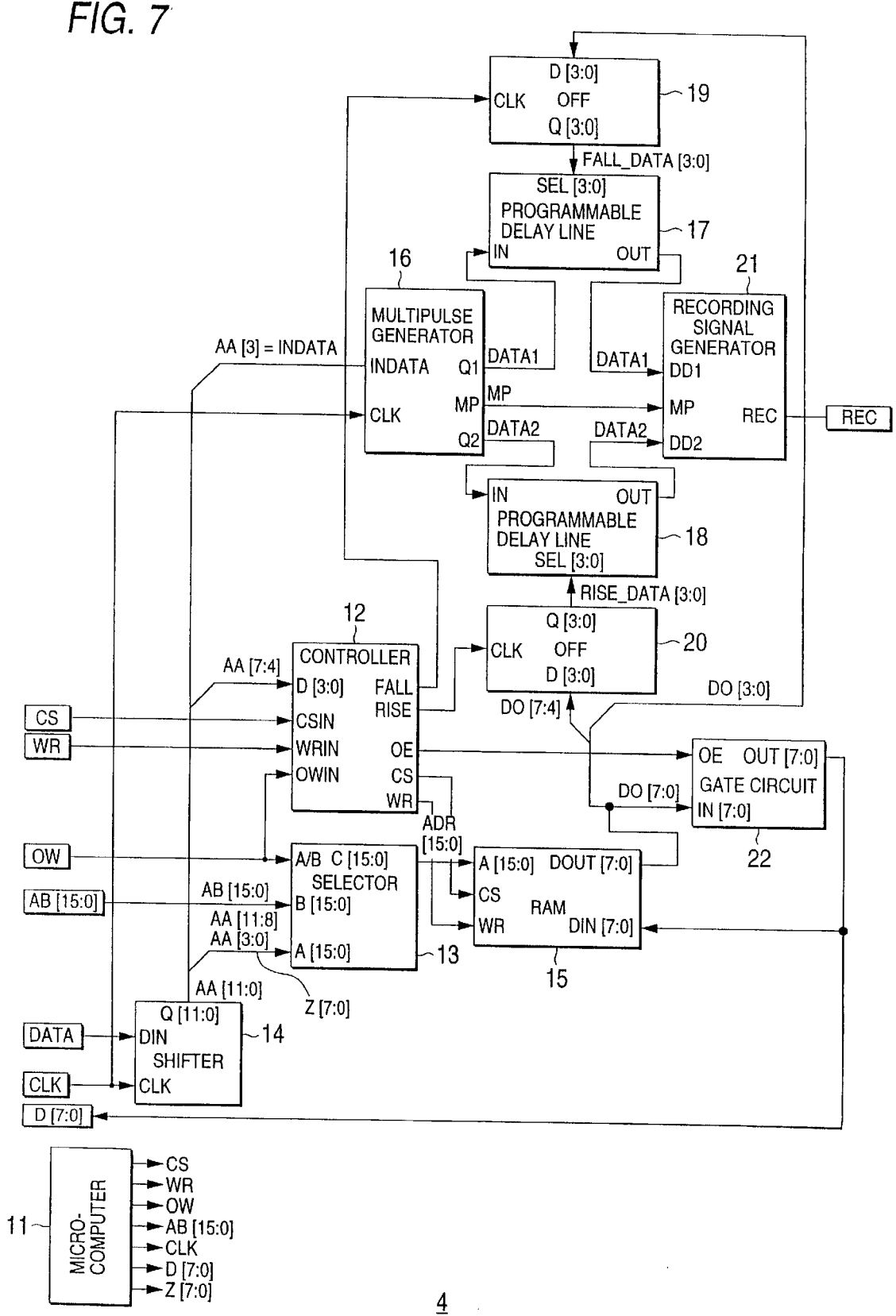
FIG. 7 is a block diagram showing an example configuration of the recording circuit 4 shown in FIG. 5.

FIG. 7 shows an example configuration of the recording circuit 4 shown in FIG. 5.

A microcomputer 11 controls the respective blocks that constitute the recording circuit 4 by using various signals such as CS, WR, OW, AB[15:0], CLK, D[7:0], and Z[7:0]. For example, the notation data D[7:0] means the 0th to 7th bits of data D. Therefore, if the data D is constituted of 8 bits, the data D[7:0] means the data D itself. Further, the notation data D[0], for instance, means the 0th bits of the data D. The 0th bit means the LSB (least significant bit).

In writing or reading data D[7:0] to or from a RAM (random access memory) 15, the microcomputer 11 turns a chip select signal CS, which is usually at a L-level, into a H-level, for instance. The microcomputer 11 turns a write signal WR into a H-level in reading data D to the RAM 15, and into a L-level in reading data D from the RAM 15. Further, the microcomputer 11 outputs an overwrite signal OW that indicates whether to perform overwriting, i.e., whether modulated data should be recorded.

In writing or reading data to or from the RAM 15, the microcomputer 11 outputs an address signal AB[15:0] that designates a write or read address. Further, the microcomputer 11 supplies a clock signal CLK to part of the blocks of the recording circuit 4. Further, the microcomputer 11 outputs data D[7:0] to be written to the RAM 15, and receives data D[7:0] that are read from the RAM 15. Still further, the microcomputer 11 detects a zone to which laser light is applied from the pickup 3, and outputs a zone data Z[7:0] that indicates the detected zone.

A controller 12 is supplied with the chip select signal CS, the write signal WR, and the overwrite signal OW from the microcomputer 11 at input terminals CSIN, WRIN, and OWIN, respectively. Further, the controller 12 is supplied, at an input terminal D[3:0], with data AA[7:4] which is the fourth to seventh bits of a 12-bit data AA[11:0] that is output from a shifter 14.

In response to the chip select signal CS, the write signal WR, and the overwrite signal OW, the controller 12 generates signals to be output from output terminals OE, CS, and WR and actually outputs those signals. (In the following, a signal that is output from the output terminal OE is called an enable signal, where appropriate. Since signals that are output from the output terminals CS and WR correspond to the chip select signal CS and the write signal WR that are input to the controller 12, they are also called a chip select signal and a write signal, where appropriate.) Further, the controller 12 detects rising edges and falling edges of modulated data DATA based on the data AA[7:4], and outputs, at output terminals RISE and FALL, edge signals RISE and FALL that rise from a L-level to a H-level so as to be timed to the detected rising edges and falling edges and kept at the H-level for only a 1-clock period.

A selector 13 is a 16-bit selector, for instance, and is supplied, at input terminals A/B and B[15:0], with the overwrite signal OW and the address signal AB[15:0], respectively, from the microcomputer 11. The selector 13 is also supplied, at an input terminal A[15:0], with a 16-bit data that has, as low-order 8 bits, data AA[3:0] and AA[11:8] that are the 0th to 3rd bits and the 8th to 11th bits, respectively, of the data AA[11:0] that is output from the shifter 14, and also has, as high-order 8 bits, the zone data Z[7:0] that is output from the microcomputer 11. (Since this 16-bit data serves as a 16-bit address for the RAM 15 as well as the address signal AB[15:0] does, it is called an address signal AB'[15:0], where appropriate.)

The selector 13 selects the address signal AB[15:0] when the overwrite signal OW is at a L-level and the address signal AB'[15:0] when the overwrite signal OW is at a H-level, and outputs the selected address signal as an address signal ADR[15:0] at an output terminal C[15:0].

The shifter 14 is a 12-bit shifter, for instance, and is supplied with the modulated data DATA and the clock signal CLK at input terminals DIN and CLK, respectively. Incorporating a 12-bit register, the shifter 14 stores the modulated data DATA at the LSB of the register and copies the value of each bit of the register to the 1-bit higher bit (1-bit leftward shift) in synchronism with the clock signal CLK. Storage values of the register that is incorporated in the shifter 14, which are the modulated data AA[11:0] as converted into 12-bit parallel data, are divided into data AA[3:0] of the 0th to 3rd bits, data AA[7:4] of the 4th to 7th bits, and data AA[11:8] of the 8th to 11th bits. As described above, the data AA[3:0] and AA[11:8] are supplied to the selector 13 while the data AA[7:4] is supplied to the controller 12.

The 3rd bit AA[3] of the modulated data AA[11:0] is also supplied to a multipulse generator 16.

For example, the RAM 15 has a 16-bit address space and stores 8-bit data. The RAM 15 is supplied with the chip select signal CS and the write signal WR from the controller 12 at input terminals CS and WR, respectively. The RAM 15 is also supplied with the address signal ADR[15:] from the selector 13 at an input terminal A[15:0] and with the data D[7:0] from the microcomputer 11 at a data input terminal DIN.

When both of the chip select signal CS and the write signal WR are at a H-level, the RAM 15 stores d ata D[7:0] that is output from the microcomputer 11 at an address in dicated by the address signal ADR[15:0]. When the chip select signal CS is at a H-level and the write signal WR is at a L-level, in the RAM 15, data D[7:0] is read out from an address indicated by the address signal ADR[15:0] and output from an output termin al DOUT[7:0].

The multipulse generator 16 is supplied with the 3rd bit AA[3] of the 12-bit modulated data AA[11:0] from the shifter 14 at an input terminal INDATA. The multipulse generator 16 is also supplied with the clock signal CLK from the microcomputer 11 at an input terminal CLK.

Based on the 3rd bit AA[3] of the modulation data and the clock signal CLK, the multipulse generator 16 generates data DATA1 to become a rear end pulse, data MP to become burst pulses, and data DATA2 to become a front end pulse, and outputs those signals at output terminals Q1, MP, and Q2, respectively.

Programmable delay lines 17 and 18 delay the data DATA1 and DATA2 by given values y and x in accordance with 4-bit data FALL_DATA[3:0] and RISE_DATA[3:0] that are supplied from DFFs 19 and 20, respectively, and output delayed data DDATA1 and DDATA2 at output terminals OUT.

The DFFs 19 and 20 latch low-order 4 bits DO[3:0] and high-order 4 bits of the data DO[7:0] that are output from the RAM 15 so as to be timed to the falling edge signal FALL and the rising edge signal RISE that are supplied from the controller 12, respectively, and supply those bits as the data FALL_DATA[3:0] and RISE_DATA[3:0] to the programmable delay lines 17 and 18, respectively.

A recording signal generator 21 generates recording pulses as described in connection with FIGS. 6A–6D by performing logical operations on the delayed data DDATA1 and DDATA2 that are supplied from the programmable delay lines 17 and 18 and the data MP that is supplied from the multipulse generator 16, and outputs the recording pulses at an output terminal REC.

A gate circuit 22, which is an 8-bit, 3-state gate, for instance, receives the data DO[7:0] that is read out from the RAM 15, and supplies, as data D[7:0], the received data DO[7:0] to the microcomputer 11 only when the enable signal OE that is output from the controller 12 is, for instance, at a H-level among L and H-levels.

In the above-configured recording circuit 4, as described later, the positions of the rising edge and the falling edge of a front end pulse and a rear end pulse, respectively, that constitute recording pulses are changed by the delays, so that their pulse widths are changed. The microcomputer 11 sets data D[7:0] as delays x and y of a front end pulse and a rear end pulse, respectively, that constitute recording pulses, for each linear velocity, for instance, for each zone, and the data D[7:0] is supplied to the RAM 15 and stored therein. (The mode in which the above processing is performed is called a data setting mode.) In direct overwriting (recording), recording pulses are generated that have been relayed based on the data D[7:0]. (The mode in which this processing is performed is called an overwrite mode.)

In the data setting mode, the microcomputer 11 renders both of the chip select signal CS and the write signal WR at a H-level and the overwrite signal OW at a L-level.

The microcomputer 11 sets 4-bit RISE_DATA[3:0] and FALL_DATA[3:0] that correspond to delays x and y, respectively, suitable for each zone, and generates 8-bit data D[7:0] that is constituted of RISE_DATA[3:0] (high-order 4 bits) and FALL_DATA[3:0] (low-order 4 bits).

The recording compensation needs to be performed in accordance with not only the linear velocity but also the length of marks and spaces, in particular, short ones.

Therefore, the microcomputer 11 sets delays so that they are suitable for each zone and lengths of marks and spaces to be formed, i.e., modulated data to be recorded.

Specifically, now consider arbitrary, consecutive 12 bits, for instance, in modulated data. Data D[7:0] as most appropriate delays is determined based on both of a zone to which the modulated data are to be recorded and the high-order 4 bits and the low-order 4 bits (8 bits in total) of the 12 bits.

The data D[7:0] thus determined is supplied from the microcomputer 11 to the RAM 15.

It is preferable to determine data D[7:0] in advance by, for instance, conducting an experiment and store those data in a ROM (read only memory; not shown). In this case, the microcomputer 11 may be adapted to read the data D[7:0] from the ROM in the data setting mode.

Again consider arbitrary, consecutive 12 bits in modulated data. When receiving the data D[7:0] as the most appropriate delays that has been determined based on both of data AD1 that is constituted of the high-order 4 bits and the low-order 4 bits (8 bits in total) of the 12 bits and a zone z to which the modulated data are to be recorded, the microcomputer 11 generates a 16-bit address signal AB[15:0] and outputs it to the selector 13.

Since in this case the overwrite signal OW is at a L-level as described above, the selector 13 selects the address signal AB[15:0] that is input from the microcomputer 11 to the input terminal B[15:0], and supplies it to the RAM 15 as an address signal ADR[15:0].

On the other hand, when receiving a H-level chip select signal CS and write signal WR and a L-level overwrite signal OW, the controller 12 outputs a H-level chip select signal CS and write signal WR to the RAM 15.

Therefore, in the RAM 15, the data D[7:0] is stored (written) at an address indicated by the address signal ADR[15:0].

In the similar manner, various data D[7:0], i.e., delays, each being suitable for both of a zone and lengths of marks and spaces, i.e., modulated data to be recorded, are stored.

To read out data D[7:0] at a certain address ADR[15:0] from the RAM 15 to confirm that the data D[7:0] is correct or for some other purpose, the microcomputer 11 renders the chip select signal CS at a H-level and the write signal WR and the overwrite signal OW at a L-level. The microcomputer 11 then outputs an address signal AB[15:0] to the selector 13. In this case, the controller 12 outputs a H-level chip select signal CS and a L-level write signal WR to the RAM 15 and eoutputs a H-level enable signal OE to the gate circuit 22. The selector 13 selects the address signal AB[15:0] that is sent from the microcomputer 11, and outputs it to the RAM 15 as an address signal ADR[15:0].

When receiving the H-level chip select signal CS, the L-level write signal WR, and the address signal ADR[15:0], as described above the RAM 15 reads out the data D[7:0] from the address corresponding to the address signal ADR [15:0], and outputs it to the gate circuit 22 as data DO[7:0]. As described above, when receiving the H-level enable signal OE, the gate circuit 22 forwards, to the microcomputer 11, the data DO[7:0] that is sent from the RAM 15. Thus, the data DO[7:0] that is read out from the RAM 15 is supplied to the microcomputer 11.

Next, in the overwrite mode, the microcomputer 11 renders the chip select signal CS and the overwrite signal OW at a H-level and the write signal WR at a L-level. Further, the microcomputer 11 recognizes a zone that the pickup 3 is accessing, and supplies zone data Z[7:0] corresponding to the recognized zone to the selector 13.

In this case, the shifter 14 is supplied with modulated data DATA that are synchronized with the clock signal CLK. The shifter 14 stores received modulated data in the LSB of the 12-bit register that is incorporated in itself and shifts storage values of the register in synchronism with the clock signal CLK. The shifter 14 then outputs resulting 12-bit modulated data AA[11:0]. Of the 12-bit modulated data AA[11:0], the 0th to 3rd bits AA[3:0] and the 8th to 11th bits AA[11:8] are supplied to the selector 13, the 3rd bit AA[3] is supplied to the multipulse generator 16, and the 4th to 7th bits AA[7:4] are supplied to the controller 12.

The zone data Z[7:0] that is output from the microcomputer 11 and the modulated data AA[3:0] and AA[11:8] are combined into single 16-bit data. Thus, as described above, 16-bit data (address signal) AB'[15:0] is formed in which the zone data [7:0] and the modulated data AA[3:0] and AA[11:8] are arranged in this order from the MSB, for instance, and supplied to the input terminal A[15:0] of the selector 13.

In this case, since the overwrite signal OW is at a H-level, the selector 13 selects the address signal AB'[15:0] that is input to the input terminal A[15:0], and supplies it to the RAM 15 as an address signal ADR[15:0].

On the other hand, when receiving the H-level chip select signal CS and the L-level write signal WR, the controller 12 outputs similar chip select signal CS and write signal WR to the RAM 15.

Therefore, in this case, data D[7:0] at an address corresponding to the address signal ADR[15:0] is read out from the RAM 15 and output as data DO[7:0]. That is, data DO[7:0], i.e., delays, that is suitable for both of a zone (linear velocity) to which modulated data is to be recorded and the modulated data itself is output from the RAM 15. The high-order 4 bits DO[7:4] of the data DO[7:0] are supplied to the DFF 20 while the low-order 4 bits DO[3:0] are supplied to the DFF 19.

Upon reception of the modulated data AA[7:4], the controller 12 detects a rising edge and a falling edge of the modulated data based on the modulated data AA[7:4]. In this embodiment, there is no isolated inversion in the modulated data because the modulated data have been obtained by the combination of (1, 7) RLL and NRZI as described above. Therefore, if there exists a rising edge in modulated data, there necessarily occurs a case that AA[7]=0, AA[6]=0, AA[5]=1, and AA[4]=1 during a process that the modulated data is shifted in the shifter 14. If there exists a falling edge in modulated data, there necessarily occurs a case that AA[7]=1, AA[6]=1, AA[5]=0, and AA[4]=0 during a process that the modulated data is shifted in the shifter 14.

Therefore, when detecting that AA[7]=0, AA[6]=0, AA[5]=1, and AA[4]=1, the controller 12 judges that it has detected a rising edge and outputs a rising edge signal RISE. On the other hand, when detecting that AA[7]=1, AA[6]=1, AA[5]=0, and AA[4]=0, the controller 12 judges that it has detected a falling edge and outputs a falling edge signal FALL.

If the minimum inversion width of modulated data is not equal to 2, the method of detecting a rising edge and a falling edge in the controller 12 needs to be changed so as to be suitable for such a case.

The falling edge signal FALL and the rising edge signal RISE are output to the DFFs 19 and 20, respectively. The DFFs 19 and 20 latch the data D[3:0] and D[7:4] that are sent from the RAM 15 in synchronism with the falling edge signal FALL and the rising edge signal RISE, respectively, and output those data as data FALL_DATA[3:0] and RISE_DATA[3:0] to the programmable delay lines 17 and 18, respectively.

On the other hand, receiving the data AA[3] from the shifter 14 as modulated data, the multipulse generator 16 generates data DATA1, DATA2, and MP and outputs those data to the programmable delay lines 17 and 18 and the recording signal generator 21, respectively. The programmable delay lines 17 and 18 delay the data DATA1 and DATA2 by given values y and x in accordance with the 4-bit data FALL_DATA[3:0] and RISE_DATA[3:0] that are supplied from the DFFs 19 and 20, respectively, and supply delayed data DDATA1 and DDATA2 to the recording signal generator 21. The recording generator 21 generates and outputs recording pulses based on the delayed data DDATA1 and DDATA2 that are sent from the programmable delay lines 17 and 18 and the data MP that is sent from the multipulse generator 16.

In an actual circuit, depending on specifications (operation speed) of the shifter 14, the RAM 15, etc., there may occur a case that deviations occur between a time point when the data DATA1 that corresponds to a falling edge of modulated data is input to the programmable delay line 17 and a time point when the data FALL_DATA[3:0] is input thereto, and between a time point when the data DATA2 that corresponds to a rising edge of modulated data is input to the programmable delay line 18 and a time point when the data RISE_DATA[3:0] is input thereto. In such a case, it is necessary to equalize the two time points, for instance, by providing a delay circuit or the like before the input terminal INDATA of the multipulse generator 16 where the modulated data AA[3] is input. This may also be realized by other methods, for instance, by supplying modulated data AA[2] or AA[4], rather than AA[3], from the shifter 14 to the multipulse generator 16.

Figure 8:
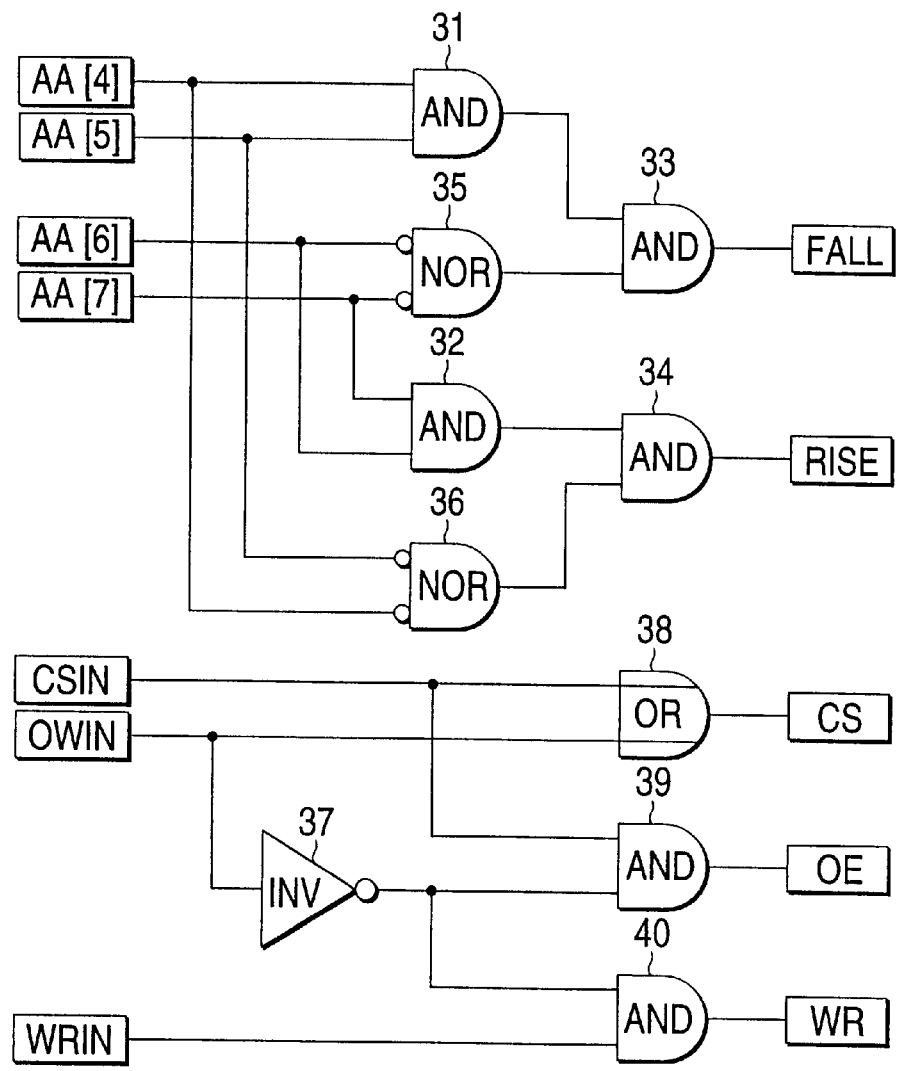
FIG. 8 is a circuit diagram showing an example configuration of a controller 12 used in the recording circuit of FIG. 7.

Next, the controller 12 shown in FIG. 7 will be described in detail with reference to FIG. 8 which shows its example configuration.

Modulated data AA[4] and AA[5] are input to an AND gate 31. The AND gate 31 calculates the AND (logical product) of those modulated data, and inputs it to one input terminal of an AND gate 33. An output of a NOR gate 35 is input to the other input terminal of the AND gate 33. Thus, the AND gate 33 calculates the AND of the outputs of the AND gate 31 and the NOR gate 35, and outputs the calculation result as a falling edge signal FALL. Receiving modulated data AA[6] and AA[7], the NOR gate 35 calculates the NOR (negation of logical sum) of those data.

Therefore, the AND gate 33 outputs an H-level ("1") falling edge signal FALL only when AA[7]=1, AA[6]=1, AA[5]=0, and AA[4]=0.

Receiving modulated data AA[6] and AA[7], an AND gate 32 calculates the AND of those data, and inputs the calculation result to one input terminal of an AND gate 34. An output of a NOR gate 36 is input to the other input terminal of the AND gate 34. Thus, the AND gate 34 calculates the AND of the outputs of the AND gate 32 and the NOR gate 36, and outputs the calculation result as a rising edge signal RISE. Receiving modulated data AA[4] and AA[5], the NOR gate 36 calculates the NOR of those data.

Therefore, the AND gate 34 outputs an H-level ("1") rising edge signal RISE only when AA[7]=0, AA[6]=0, AA[5]=1, and AA[4]=1.

On the other hand, a chip select signal CS coming from the microcomputer 11 is input to one terminal of an OR gate 38 and one terminal of an AND gate 39. An overwrite signal OW coming from the microcomputer 11 is input to the other input terminal of the OR gate 38 and an inverter 37. A write signal WR coming from the microcomputer 11 is input to one input terminal of the AND gate 40.

The OR gate 38 calculates the OR (logical sum) of the chip select signal CS and the overwrite signal OW, and outputs the calculation result as a chip select signal CS. Therefore, the chip select signal CS that is output from the controller 12 has a H-level when one of the chip select signal CS and the overwrite signal OW that are output from the microcomputer 11 is at a H-level, and has a L-level when both of those signals are at a L-level.

The inverter 37 inverts the overwrite signal OW, and supplies the inverted overwrite signal to the other input terminal of the AND gate 39 and the other input terminal of the AND gate 40. The AND gate calculates the AND of the chip select signal CS and the output of the inverter 37, and outputs the calculation result as an enable signal OE. Therefore, the enable signal OE has a H-level only when the chip select signal CS and the overwrite signal OW that are output from the microcomputer 11 are at a H-level and a L-level, respectively, and otherwise has a L-level.

The AND gate 40 calculates the AND of the output of the inverter 37 and the write signal WR, and outputs the calculation result as a write signal WR. Therefore, the write signal WR that is output from the controller 12 has a H-level only when the overwrite signal OW and the write signal WR that are output from the microcomputer 11 are at a L-level and a H-level, respectively, and otherwise has a L-level.

Figure 9:
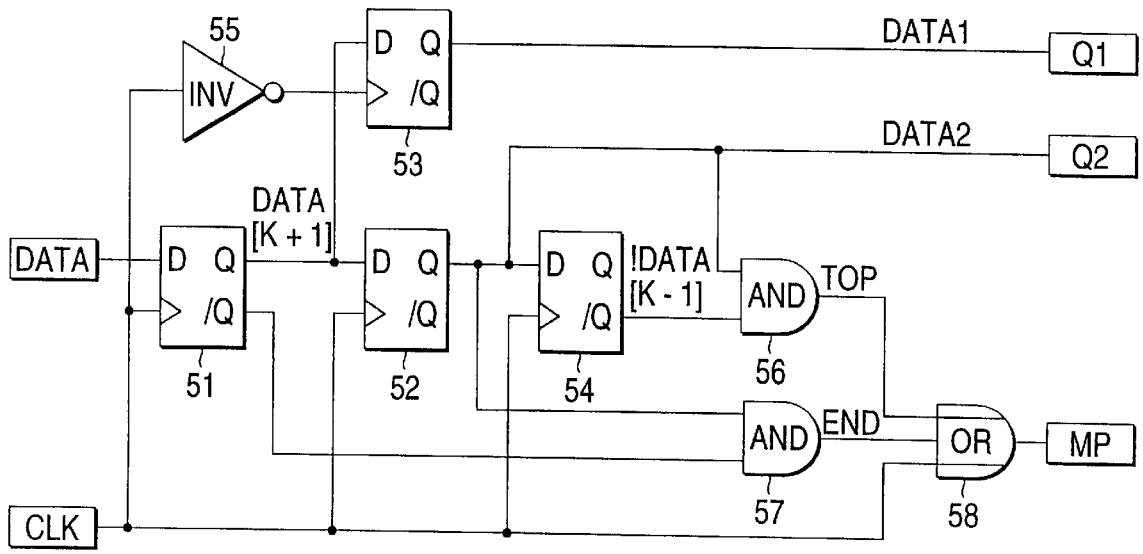
FIG. 9 is a circuit diagram showing an example configuration of a multipulse generator 16 used in the recording circuit of FIG. 7.

FIG. 9 shows an example configuration of the multipulse generator 16 shown in FIG. 7.

Data DATA which is modulated data AA[3] is supplied to a DFF 51, where it is latched so as to be timed to a clock signal CLK (for instance, a rising edge thereof), and then supplied to DFFs 52 and 53. Further, the DFF 51 supplies an inverted output /Q of the latched data DATA to one input terminal of an AND gate 57.

The DFF 53 latches the output of the DFF 51 so as to be timed to an output of an inverter 55 (for instance, a rising edge thereof). The clock signal CLK is supplied to the inverter 55. Therefore, the DFF 53 latches data that is a half clock prior to data latched by the DFF 52 (described below). The half clock prior data is output as DATA1.

On the other hand, the output of the DFF 51 so as to be timed to the clock signal CLK, and then output as data DATA2 as well as supplied to a DFF 54, one terminal of an AND gate 56, and the other gate of the AND gate 57. The output of the DFF 52 is latched by the DFF 54 so as to be timed to the clock signal CLK, and an inverted output of the DFF 54 is supplied to the other input terminal of the AND gate 56.

The AND of the output of the DFF 52 and the inverted output of the DFF 54 is calculated by the AND gate 56, and supplied to an OR gate 58. The AND of an inverted output of the DFF 51 and the output of the DFF 52 is calculated by the AND gate 57, and is also supplied to the OR gate 58.

Receiving the clock signal CLK in addition to the outputs of the AND gates 56 and 57, the OR gate 58 calculates OR of those signals, and outputs the calculation result as data MP.

Figure 10:
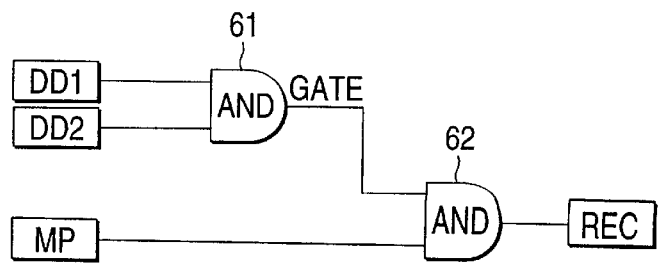
FIG. 10 is a circuit diagram showing an example configuration of a recording signal generator 21 used in the recording circuit of FIG. 7.

FIG. 10 shows an example configuration of the recording signal generator 21 shown in FIG. 7.

Receiving data DDATA1 and DDATA2 that are output from the programmable delay lines 17 and 18, respectively, an AND gate 61 calculates the AND of those data. The calculation result is input to one input terminal of an AND gate 62. Data MP is input to the other input terminal of the AND gate 62. The AND gate 62 calculates the AND of the output of the AND gate 61 and the data MP, and outputs the calculation result as recording pulses.

Next, with reference to FIGS. 11 and 12A–12J, the operation of the circuit part of FIG. 7 including the multipulse generator 16, the programmable delay lines 17 and 18, and the recording signal generator 21 will be described in further detail.

Figure 11:
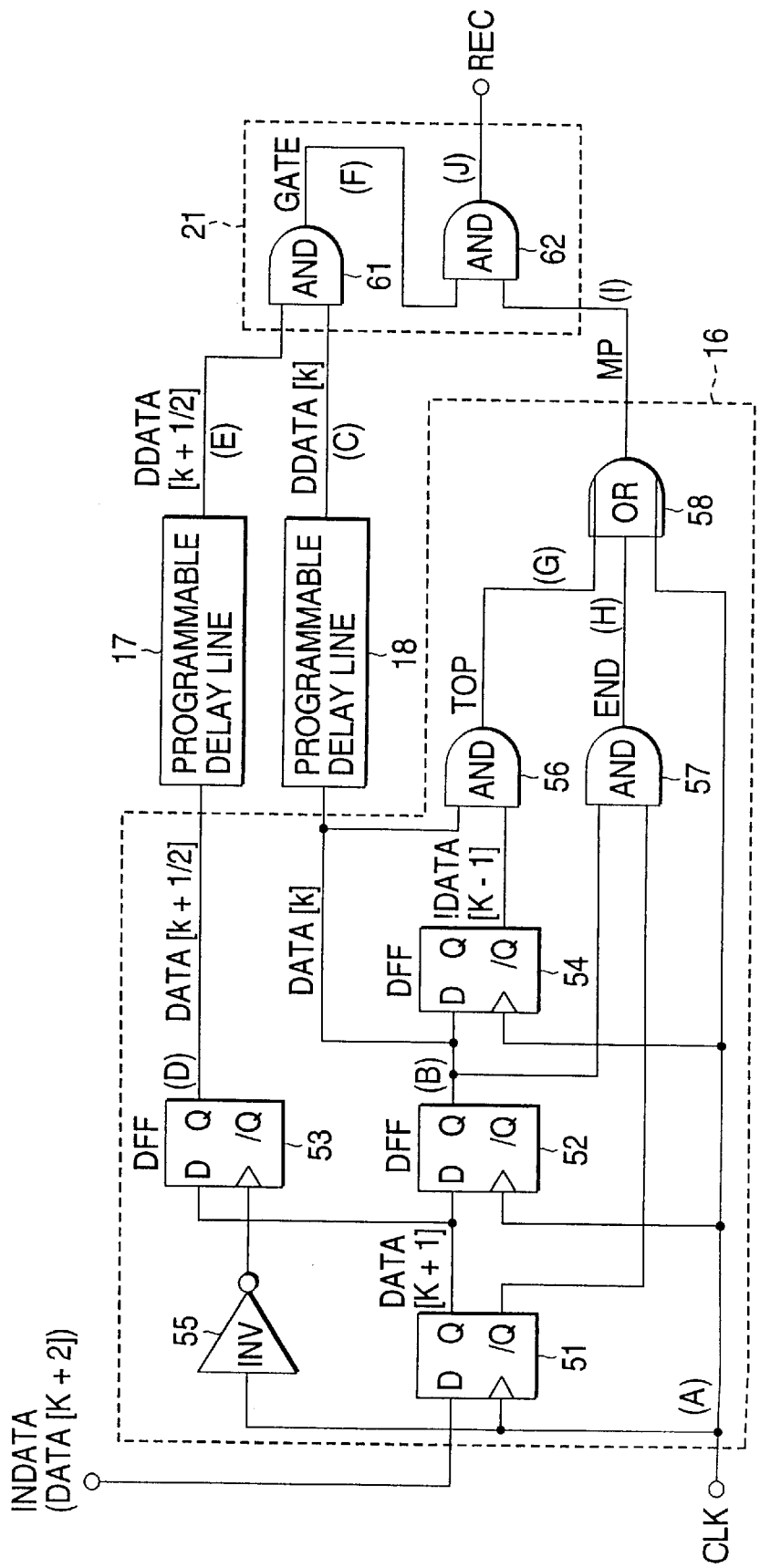
FIG. 11 is a block diagram showing an example configuration of the multipulse generator 16, programmable delay lines 17 and 18, and the recording signal generator 21 used in the recording circuit of FIG. 7.

FIG. 11 includes the circuit of FIG. 9 (multipulse generator 16), the circuit of FIG. 10 (recording signal generator 21), and the programmable delay lines 17 and 18. FIGS. 12A–12J show signal waveforms at respective points in FIG. 11.

A clock signal CLK (see FIG. 12A) coming from the microcomputer 11 (see FIG. 7) is supplied to the DFFs 51, 52, and 54, the inverter 55, and the OR gate 58. Modulated data AA[3] is supplied to the DFF 51, and sequentially latched by the DFF 51, 52, and 54 so as to be timed to rising edges of the clock signal CLK.

A latch output Q of the DFF 52 is denoted by DATA[k], where k is a variable corresponding to time. In this case, the modulated data AA[3], a latch output of the DFF 51, and a latch output of the DFF 54 can be denoted by DATA[k+2], DATA[k+1], and DATA[k−1], respectively.

On the other hand, the clock signal CLK is inverted by the inverter 55, and supplied to a clock terminal of the DFF 53. The latch output DATA[k+1] of the DFF 51 is supplied to an input terminal D of the DFF 53, and latched by the DFF 53 so as to be timed to a rising edge of the inverted clock signal CLK.

Figure 12:
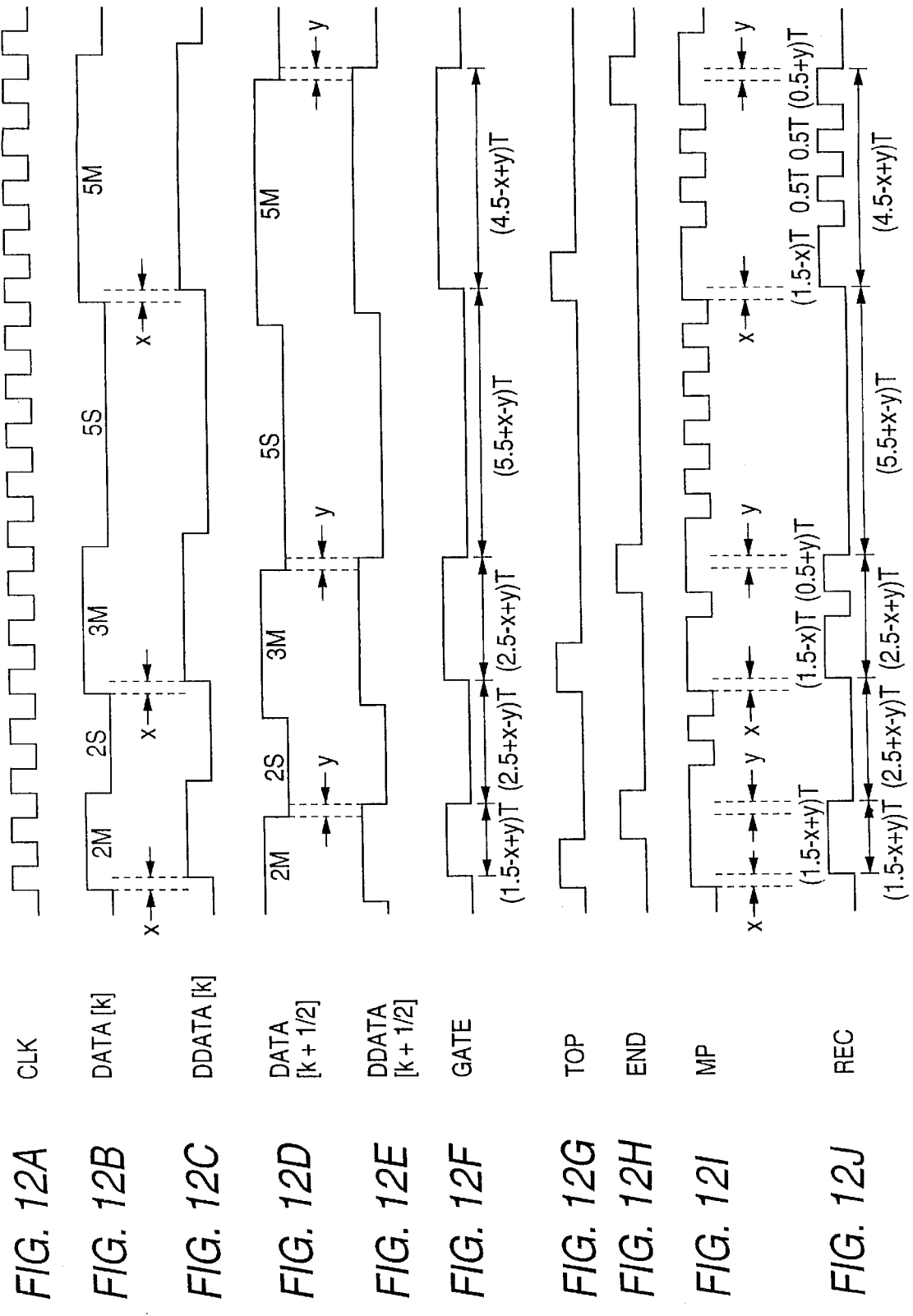
FIGS. 12A–12J are waveform diagrams showing operations of the multipulse generator 16, the programmable delay lines 17 and 18, and the recording signal generator 21 shown in FIG. 11.

As a result, if the data DATA[k] is assumed to be as shown in FIG. 12B, data DATA[k+½] that is advanced by a half clock from the data DATA[k] is obtained as a latch output of the DFF 53 as shown in FIG. 12D.

The latch outputs of the DFFs 52 and 53, i.e., the data DATA[k] and DATA[k+½] are supplied to the programmable delay lines 18 and 17, respectively, where they are delayed by small values x and y, respectively. Thus, the data DATA[k] (see FIG. 12B) and DATA[k+½] (see FIG. 12D) are converted into delayed data DDATA[k] (DDATA2 in FIG. 7) and DDATA[k+½] (DDATA1 in FIG. 7) as shown in FIGS. 12C and 12E, respectively. Both delayed data DDATA[k] and DDATA[k+½] are supplied to the AND gate 61.

The AND gate 61 calculates the AND of the delayed data DDATA[k] (see FIG. 12C) and DDATA[k+½] (see FIG. 12E), to generate a gate signal GATE as shown in FIG. 12F. The gate signal GATE is supplied to the AND gate 62.

In the above manner, the gate signal GATE has a width (n−x+y)T for the data DATA[k] of nM (i.e., a H-level portion having a width nT).

On the other hand, the data DATA[k] that is sent from the DFF 52 is latched by the DFF 54, whereby it is converted into data DATA[k−1] which is one-clock delayed from the data DATA[k]. Its inverted output !DATA[k−1] (mark "!" means inversion) is supplied to one input terminal of the AND gate 56. The other input terminal of the AND gate 56 is supplied with the data DATA[k] that is the latch output of the DFF 52. The AND gate 56 calculates the AND of the data !DATA[k−1] and DATA[k], to generate a front end pulse TOP (see FIG. 12G) whose front end coincides with that of the data DATA[k] and which has a pulse width of one clock. (The front end pulse TOP corresponds to a derivative of a rising edge portion of the data DATA[k].) The front end pulse TOP is supplied to the OR gate 58.

Supplied with data !DATA[k+1] (inverted data of the data DATA[k+1]) from the DFF 51 as well as with the data[k] from the DFF 52, the AND gate 57 calculates the AND of those data. As a result, the AND gate 57 generates a rear end pulse END (see FIG. 12H) whose rear end coincides with that of the data DATA[k] and a pulse width of one clock. (The rear end pulse END corresponds to a derivative of a falling edge portion of the data DATA[k].) The rear end pulse END is supplied to the OR gate 58.

Supplied with the clock signal CLK (burst pulses; see FIG. 12A), the front end pulse TOP (see FIG. 12G), and the rear end pulse END (see FIG. 12H), the OR gate 58 calculates the OR of those signals, to generate data (multiple pulses) MP as shown in FIG. 12I. The data MP is supplied to the AND gate 62.

The AND gate 62 calculates the AND of the gate signal GATE (see FIG. 12F) and the data MP (see FIG. 12I), to generate, as recording pulses corresponding to a mark of a length nT, a signal REC that is represented by a formula xS+(1.5−x)M+(n−2)(0.5S+0.5M)+yM+(0.5−y)S as shown in FIG. 12J.

Therefore, when x=y=0, for instance, recording pulses are represented by a formula 1.5M+(n−2)(0.5S+0.5M)+0.5S, which is the same as in the case of the recording scheme A.

When x=y=0.5, for instance, recording pulses are represented by a formula 1.0M+(n−2)(0.5S+0.5M)+0.5M+0.5S, which is the same as in the case of the recording scheme B.

As is understood from the above, by making the delays x and y equal to each other and varying those in a range of 0.0 to 0.5, a recording scheme (recording compensation scheme) can be realized in which the recording signal is continuously varied between the recording signal A (see FIG. 6C) and the recording signal B (see FIG. 6D) in accordance with the linear velocity (in this embodiment, as described above, the zone). As a result, recording compensation can easily be performed in accordance with the linear velocity, whereby a system having a large recording capacity and capable of high-speed random access according to the MCAV scheme, for instance, can be realized.

In particular, by varying the delays x and y in accordance with not only the linear velocity but also the arrangement of modulated data, recording compensation for edge positional deviations due to thermal interference etc. in data corresponding to short marks and spaces.

When the delays x and y are varied in the range of 0.0 to 0.5 as described above, the pulse widths of the front end pulse and the rear end pulse varies in a range of 1.0T to 1.5T. When the delays x and y are varied in a different range, say, 0.0 to 1.0, the pulse widths of the front end pulse and the rear end pulse varies in a range of 0.5T to 1.5T.

Figure 4:
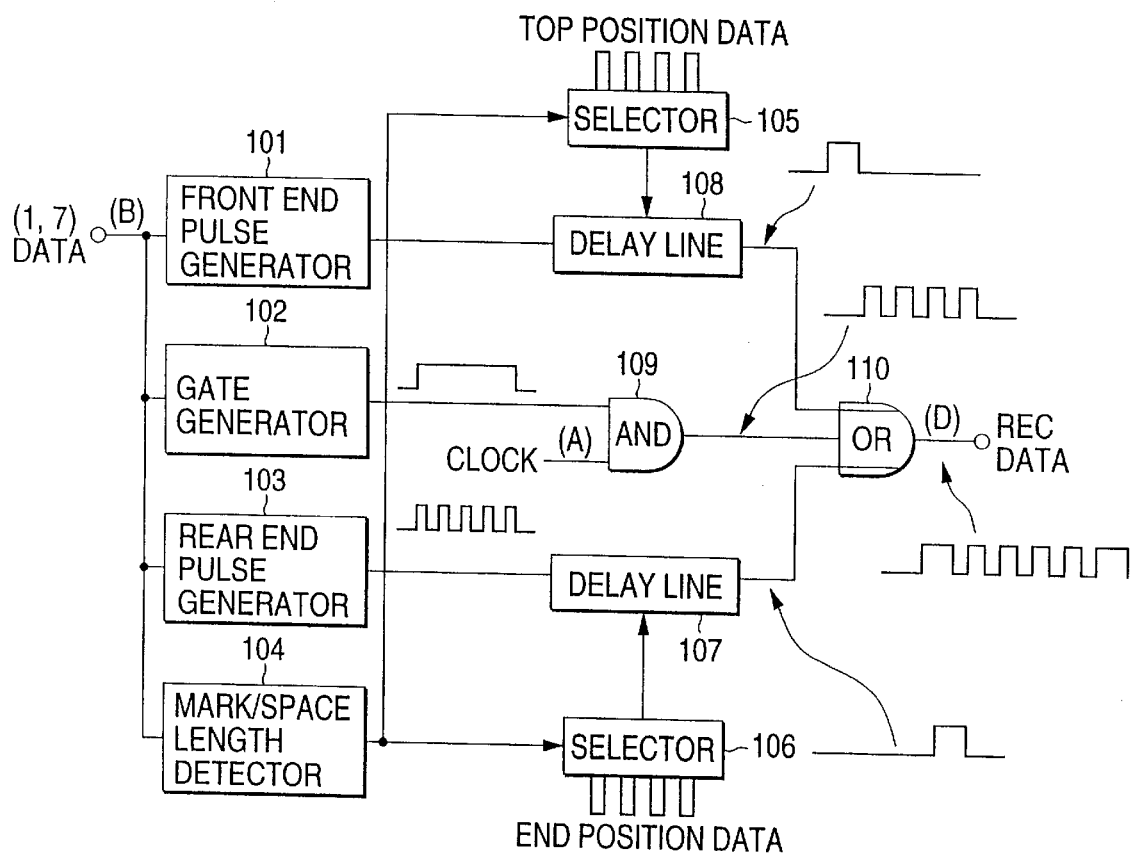
FIG. 4 is a block diagram showing the configuration of an example of a conventional recording compensation circuit.

Recording pulses obtained in the above manner in which not only the edge positions of the front end pulse and the rear end pulse but also their pulse widths vary are entirely different from those obtained by the recording compensation circuit of FIG. 4 in which only the edge positions vary and the pulse widths are fixed.

In recording pulses obtained by the circuit of FIG. 4, the front end pulse and the rear end pulse are shifted front and rear with their pulse widths kept constant. In contrast, in recording pulses obtained by the recording circuit 4, the rising edge of the front end pulse and the falling edge of the rear end pulse are varied and their pulse widths are varied at the same time. As a result, although the scale of the recording circuit 4 is almost the same as that of the conventional recording circuit, it can provide recording compensation having a large variation range and a high degree of freedom.

In view of incorporating the disc drive of FIG. 5 into a system, it is desirable that the recording circuit 4 be provided as a one-chip IC. Further, particularly from the viewpoint of cost, it is desirable that such a IC be manufactured by a CMOS process. However, in manufacturing such an IC, an important issue is how to form accurate programmable delay lines 17 and 18 within the IC.

For example, where each of the programmable delay lines 17 and 18 is constructed as a cascade connection of a plurality of inverters and the delay x or y is set by the number of connected stages, the delay will vary by a factor of 1 to 3 due to various factors such as the temperature and the speed of a CMOS process and a power supply voltage. As thus exemplified, how to always obtain desired delays x and y is an important issue in manufacturing a CMOS IC of the recording circuit 4.

Figure 13:
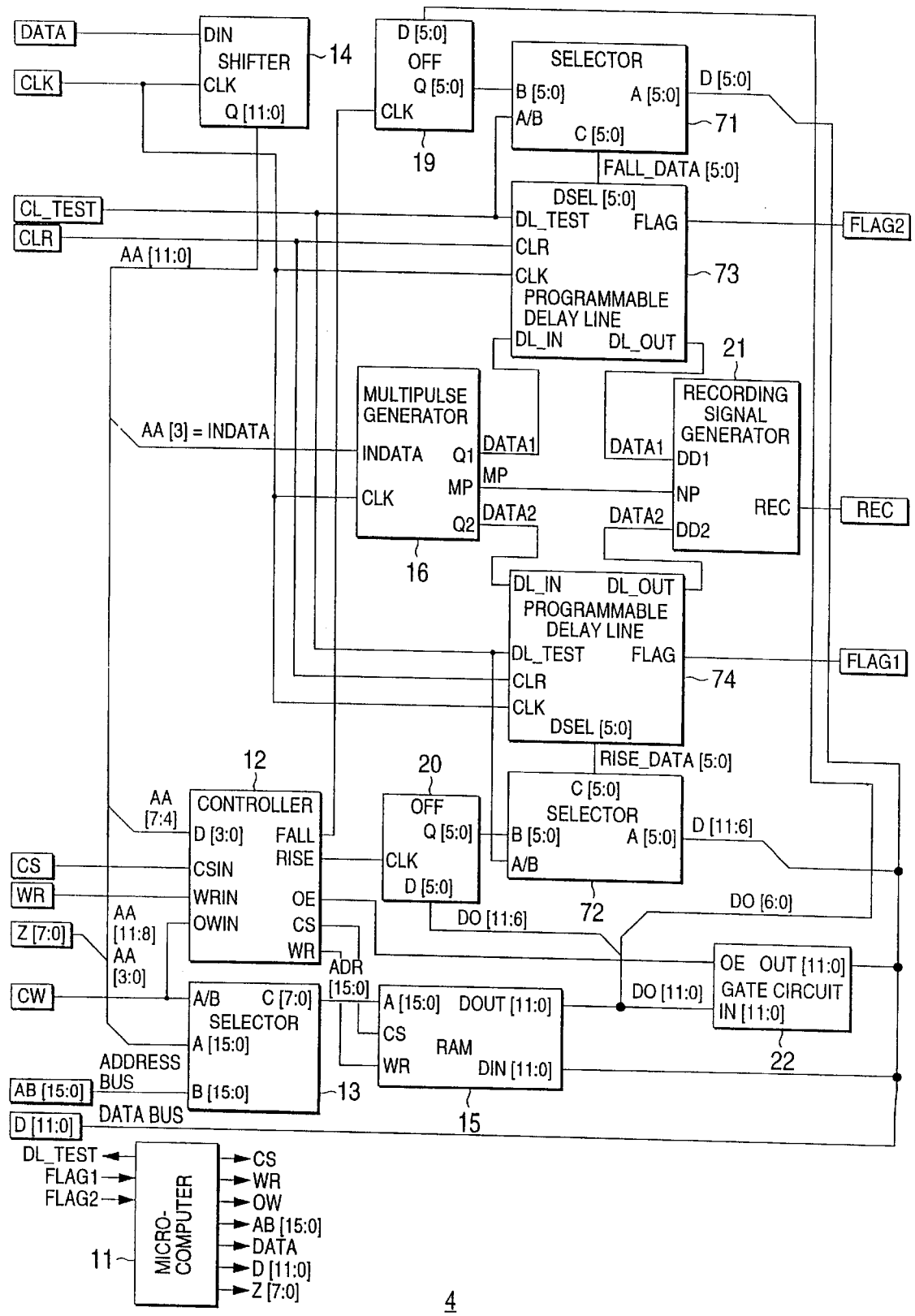
FIG. 13 is a block diagram showing another example configuration of the recording circuit 4 used in FIG. 5.

The recording circuit 4 can be implemented as a one-chip IC by employing a configuration shown in FIG. 13, for instance.

That is, FIG. 13 shows another example configuration of the recording circuit 4. The components and signals in FIG. 13 corresponding to those in FIG. 7 are given the same symbols, and descriptions therefor will be omitted where appropriate. The recording circuit 4 of FIG. 13 are basically the same as that of FIG. 7 except that selectors 71 and 72 are newly provided and programmable delay lines 73 and 74 are substituted for the programmable delay lines 17 and 18, respectively.

In the embodiment of FIG. 13, the microcomputer 11 performs, in addition to transmission and reception of the signals described in connection with FIG. 7, transmission of a signal DL_TEST and reception of signals FLAG1 and FLAG2 as well as control that is associated with the transmission and reception of the those signals.

Further, in the embodiment of FIG. 13, the data RISE_DATA and FALL_DATA which correspond to the delays x and y are 6-bit data rather than 4-bit data and accordingly the RAM 15 is made a 12-bit (=6+6) RAM. The DFFs 19 and 20 are adapted to latch low-order 6 bits DO[5:0] and high-order 6 bits DO[11:6], respectively, of 12-bit data DO[11:0] that is output from the RAM 15.

The selector 71 is a 6-bit selector, for instance, and is supplied with a signal DL_TEST and low-order 6 bits D[5:0] of data D[11:0] from the microcomputer 11 at input terminals A/B and A[5:0], respectively. The selector 71 is also supplied with a latch output of the DFF 19 at an input terminal B[5:0]. For example, the selector 71 selects the input to the input terminal A[5:0] when the signal DL_TEST is "1," and selects the input to the input terminal B[5:0] when the signal DL_TEST is "0." The selector 71 outputs the selected input at an output terminal C[5:0]. That is, the selector 71 selects and outputs the low-order 6 bits D[5:0] of the data D[11:0] that is sent from the microcomputer 11 when the signal DL_TEST is "1," and does the low-order 6 bits DO[5:0] of the data DO[11:0] that has been read out from the RAM 15 and latched by the DFF 19 when the signal DL_TEST is "0." The output of the selector 71, i.e., data FALL_DATA[5:0] corresponding to the delay y, is supplied to the programmable delay line 73.

The selector 72 is a 6-bit selector as in the case of the selector 71, and is supplied with the signal DL_TEST and high-order 6 bits D[11:6] of the data D[11:0] from the microcomputer 11 at input terminals A/B and A[5:0], respectively. The selector 72 is also supplied with a latch output of the DFF 20 at an input terminal B[5:0]. Operating in a similar manner to the selector 71, the selector 72 selects the input to the input terminal A[5:0] when the signal DL_TEST is "1," and selects the input to the input terminal B[5:0] when the signal DL_TEST is "0." The selector 72 outputs the selected input at an output terminal C[5:0]. That is, the selector 72 selects and outputs the high-order 6 bits D[11:6] of the data D[11:0] that is sent from the microcomputer 11 when the signal DL_TEST is "1," and does the high-order 6 bits DO[5:0] of the data DO[11:0] that has been read out from the RAM 15 and latched by the DFF 20 when the signal DL_TEST is "0." The output of the selector 72, i.e., data RISE_DATA[5:0] corresponding to the delay x, is supplied to the programmable delay line 74.

As in the case of the programmable delay lines 17 and 18, the programmable delay lines 73 and 74 delay data DATA1 and DATA2 by the given values y and x in accordance with the 6-bit data FALL_DATA[5:0] and RISE_DATA[5:0] that are supplied from the selectors 71 and 72, respectively, and output delayed data DDATA1 and DDATA2, respectively.

Supplied with the signal DL_TEST, a clear signal CLR, and a clock signal CLK, the programmable delay lines 73 and 74 perform measurement processing (described later) and output flags FLAG2 and FLAG1 corresponding to processing results, respectively.

Figure 14:
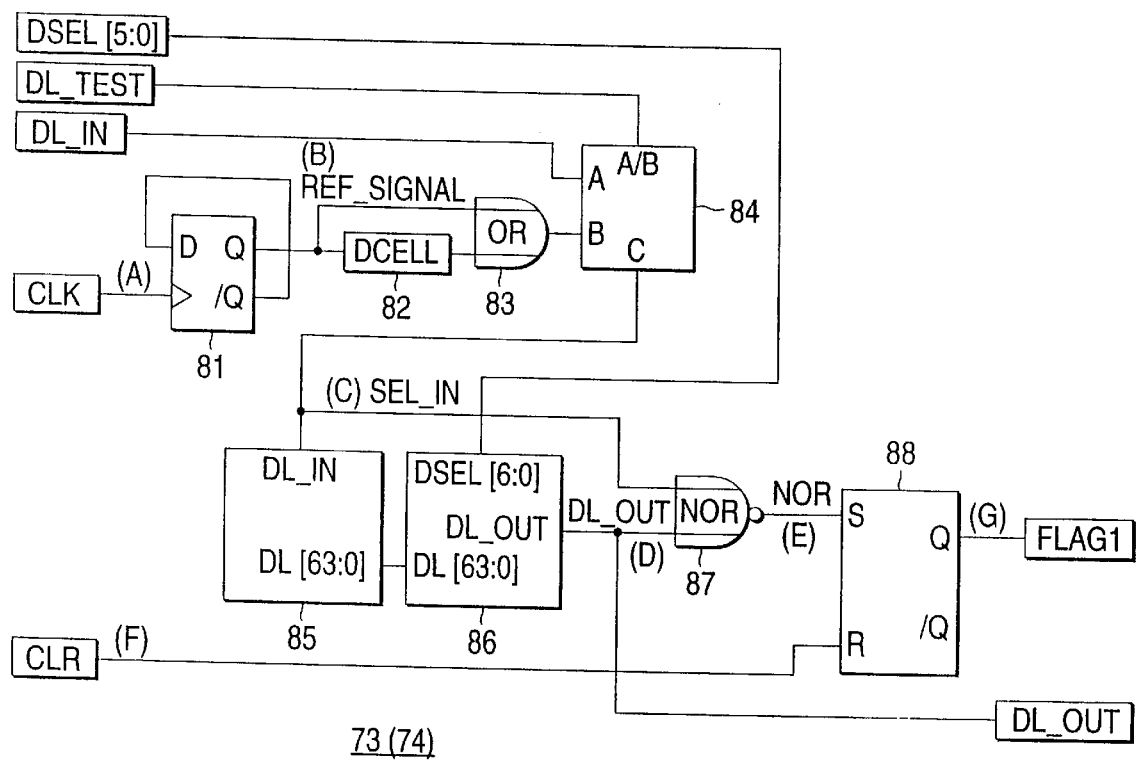
FIG. 14 is a block diagram showing an example configuration of a programmable delay line 73 (or 74) used in the recording circuit 4 of FIG. 13.

FIG. 14 shows an example configuration of the programmable delay line 73. FIGS. 15A–15G show signal waveforms at respective points in the programmable delay line 73. Since the programmable delay line 74 is constructed in the same manner as the programmable delay line 73, a description therefor is omitted.

A DFF 81 is supplied, at an input terminal D, with an inverted latch output /Q of itself. The DFF 81 latches the input to the input terminal D in synchronism with a rising edge, for instance, of the clock signal CLK (see FIG. 15A) that is sent from the microcomputer 11. Thus, the DFF 81 outputs, as a latch output Q, a signal REF_SIGNAL (see FIG. 15B) obtained by dividing into two equal parts the frequency of the clock signal CLK.

In general, the duty cycle of the clock signal CLK is not always 50%. By dividing the frequency of the clock signal CLK into two equal parts in the DFF 81, the signal REF_SIGNAL having a duty cycle 50% is obtained.

The signal REF_SIGNAL is supplied to a delay cell 82 and one terminal of an OR gate 83.

Figure 16:
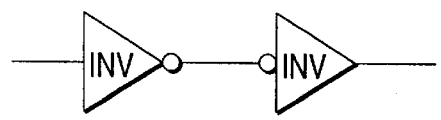
FIG. 16 is a circuit diagram showing an example configuration of a delay cell 82 used in the programmable delay line 73 of FIG. 14.

For example, the delay cell (DCELL) 82 is a series connection of two inverters (INV) as shown in FIG. 16. The delay cell 82 delays the signal REF_SIGNAL by a small time, and supplies a delayed signal to the other input terminal of the OR gate 83. The OR gate 83 calculates the OR of the signal REF_SIGNAL and its delayed version as delayed by the small time by the delay cell 82, and supplies the calculation result to an input terminal B of a selector 84.

The selector 84 is also supplied with data DATA1 (DL_IN; in the case of the programmable delay line 74, data DATA2) from the multipulse generator 16 at an input terminal A and with the signal DL_TEST from the microcomputer 11 at an input terminal A/B. For example, the selector 84 selects the data DATA1 (DL_IN) that is supplied to the input terminal A when the signal DL_TEST is "1," and selects the output of the OR gate 83 that is supplied to the input terminal B when the signal DL_TEST is "0." The selector 84 outputs the selected data at an output terminal C. The output of the selector 84 is supplied to a delay matrix 85 and one input terminal of a NOR gate 87.

Figure 17:
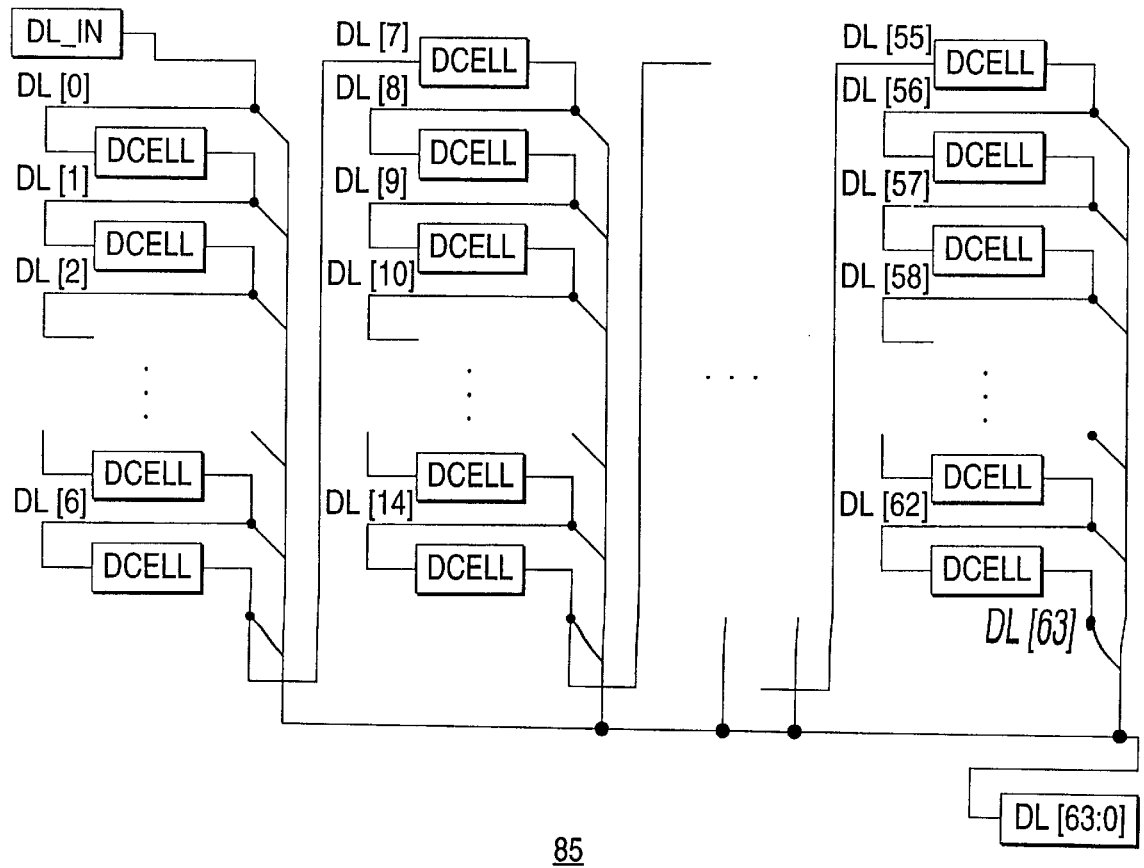
FIG. 17 is a block diagram showing an example configuration of a delay matrix used in the programmable delay line 73 of FIG. 14.

For example, as shown in FIG. 17, the delay matrix 85 is configured such that delay cells of FIG. 16 are arranged in matrix form and connected to each other in series. More specifically, in the example of FIG. 17, the delay matrix 85 has 63 (9×7) delay cells are arranged in matrix form and outputs of the 63 respective delay cells are supplied to a post-stage selector 86. The selector 86 is also supplied with the signal that is input to the first delay cell of the delay matrix 85. Thus, the selector 85 supplies the selector 86 with 64 signals that are the outputs of the respective delay cells, i.e., the 0th to 63rd delay cells, obtained by delaying the output SEL_IN of the selector 84.

In addition to the 64signals coming from the delay matrix 85, the selector 86 is supplied with data FALL_DATA[5:0] (DSEL[5:0]) from the selector 71 (see FIG. 13). (In the case of the programmable delay line 74, data RISE_DATA[5:0] is supplied from the selector 72.) The selector 86 selects one of the 64 signals that are sent from the delay matrix 85 in accordance with the data FALL_DATA[5:0] that is sent from the selector 71, and outputs, as data DDATA1 (DL_OUT), the selected signal that is a signal obtained by delaying the data DATA1 that is sent from the multipulse generator 16 in accordance with the data FALL_DATA [5:0].

The data DDATA1 (DL_OUT) is also supplied to the other input terminal of the NOR gate 87. The NOR gate 87 calculates the NOR (negation of logical sum) of the output (SEL_IN) of the selector 84 and the data DDATA1 (DL_OUT) that is sent from the selector 86. The calculation result NOR is supplied to a S terminal of a RSFF (RS flip-flop) 88.

The RSFF 88 is also supplied with the clear signal CLR (see FIG. 15F) from the microcomputer 11 at a R terminal. The RSFF 88 latches the output of the NOR gate 87 when the clear signal CLR is "0," and clears and outputs the latched content (value) when the clear signal CLR is "1." The output Q of the RSFF 88 is supplied to the microcomputer 11 as a flag FLAG1.

With the above configuration, when the signal DL_TEST is "1," the selector 84 selects the output of the OR gate 83, which is supplied to the delay matrix 85 and the NOR gate 87. Since the output of the OR gate 83 is the logical sum of the signal REF_SIGNAL (see FIG. 15B) and its slightly delayed version, it is a signal obtained by slightly delaying the falling edge of the signal REF_SIGNAL as shown in FIG. 15C.

The delay matrix 85 outputs the 64 signals that are obtained by delaying the output of the selector 84 by the 0th to 63rd delay cells, and the selector 86 selects one of the 64 signals that corresponds to the data FALL_DATA[5:0] (DSEL[5:0]). The selected signal DL_OUT is supplied to the NOR gate 87.

Figure 15:
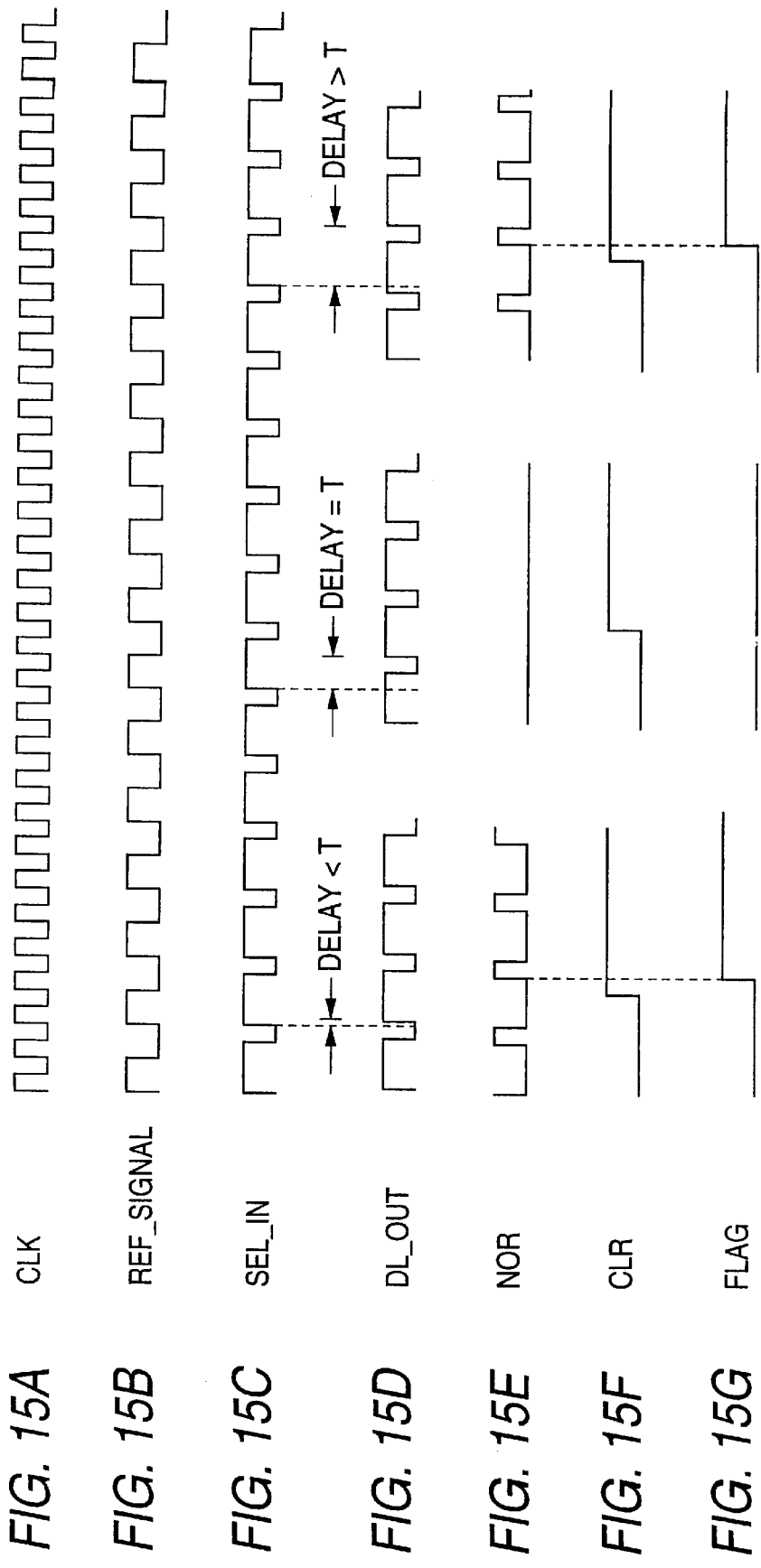
FIGS. 15A–15G are waveform diagrams showing the operation of the programmable delay line 73 shown in FIG. 14.

Therefore, if the delay of the selection signal DL_OUT (i.e., one of the 64 signals that are obtained by delaying the output of the selector 84 by the 0th to 63rd delay cells; see FIG. 15D) with respect to the signal REF_SIGNAL (see FIG. 15B) is either smaller than or larger than the period T of the clock signal CLK, a H-level appears at the output of the NOR gate 87 as shown in FIG. 15E. If the delay is equal to the period of the clock signal CLK, the output of the NOR gate 87 is kept at a L-level (also see FIG. 15E).

In the case where a H-level appears at the output of the NOR gate 87 (see FIG. 15E), the output FLAG1 of the RSFF 88 becomes "1" (see FIG. 15G) when the clear signal CLR turns to "1" (H-level; see FIG. 15F). Where the output of the NOR gate 87 is kept at a L-level (also see FIG. 15E), the output FLAG1 of the RSFF 88 remains "0" (L-level; also see FIG. 15G) irrespective of the level of the clear signal CLR (also see FIG. 15F).

Thus, the data FALL_DATA[5:0] (DSEL[5:0]) with the flag FLAG1 kept "0" is obtained by repeating the operations of resetting the RSFF 88 by making the signal DL_TEST "0" and making the clear signal CLR "1," changing the data FALL_DATA[5:0] (DSEL[5:0]), i.e., the signal to be selected by the selector 86, making the clear signal CLR "0," and then making the signal DL_TEST "1." The data FALL_DATA[5:0] thus obtained corresponds to the number of stages of delay cells necessary for delay of one clock (time T).

In the above manner, according to the programmable delay line 73 of FIG. 14, the number of stages of delay cells (each consisting of inverters as shown in FIG. 16 in this embodiment) necessary for delay of one clock can be measured.

When the signal DL_TEST is made "1," as described above the selector 71 (see FIG. 13) selects the low-order 6 bits D[5:0] of the data D[11:0] that is sent from the microcomputer 11, and the selected data D[5:0] is supplied to the programmable delay line 73 as the data FALL_DATA[5:0] (DSEL[5:0]). Therefore, the microcomputer 11 can recognize the data FALL DATA[5:0] that corresponds to 1-clock delay by changing the signal DL_TEST and the clear signal CLR as well as the data D[11:0] as described above while monitoring the flag FLAG1 Based on a recognition result, the microcomputer 11 can store data of a proper value in the RAM 15.

On the other hand, in generating recording pulses, when the microcomputer 11 makes the signal DL_TEST "0," the selector 71 (see FIG. 13) selects the output of the DFF 19 as described above. As a result, low-order 6 bits DO[5:0] of data DO[11:0] that is read out from the RAM 15 is supplied to the programmable delay line 73 as the data FALL_DATA [5:0] (DSEL[5:0]. In this case, in the programmable delay line 73, data DATA1 (DL_IN) that is sent from the multipulse generator 16 is selected by the selector 84 (see FIG. 14) and supplied to the delay matrix 85. The selector 86 selects one of the 64 signals obtained by delaying the data DATA1 (DL_IN) that is sent from the multipulse generator 16 by the 0th to 63rd delay cells in accordance with the data FALL_DATA[5:0], and outputs the selected signal as data DDATA1 (DL_OUT).

As described above, the programmable delay line 73 (or 74) can measure the number of stages of delay cells necessary for 1-clock delay as described above. The refore, when the recording circuit 4 is implemented as a one-chip IC, even if the delay time of each delay cell is varied due to various factors such as the temperature and the speed of a CMOS process and the power supply voltage, such a variation can be compensated for by rewriting the data D[11:0] to be stored in the RAM 15.

For example, the above-described measurement of the number of stages of delay cells necessary for 1-clock delay and the rewriting of data to the RAM 15 in accordance with a measurement result can be performed in starting to apply power to the system or on a regular basis after the power application.

The details of the programmable delay line 73 (or 74) are described in, for instance, Japanese Patent Application No. Hei. 7-244963 which was filed by the present assignee.

Although the above description is directed to the case where the invention is applied to the disk drive for driving a phase-change disk, the invention can also be applied to apparatuses for driving recording media other than disk-shaped ones, such as card-shaped ones. Further, the application range of the invention is not limited to recording that utilizes phase change or recording according to the MCAV scheme.

Although in the above embodiments the delays x and y are varied while they are kept equal to each other, the delays x and y need not be always equal to each other.

Further, in the above embodiment, half-clock advanced data DATA1 obtained by the DFF 53 (see FIG. 11) is delayed by the programmable delay line 17. An alternative configuration is possible in which the DFF 53 generates 1-clock advanced data and the programmable delay line 17 delays that data. In this case, recording pulses corresponding to a mark having a length nT are represented by a formula xS+(1.5−x)M+(n−3)(0.5S+0.5M)+0.5S+yM+(1.0−y)S.

As described above, according to the data recording apparatus and method of the invention, the pulse width of the front end pulse is changed by changing the position of its front edge and the pulse width of the rear end pulse is changed by changing the position of its rear edge. Therefore, for example, recording compensation can easily be performed in accordance with the linear velocity or the like.

According to the invention, the recording medium is formed with marks and spaces by using recording pulses in which the pulse width of the front end pulse is changed by changing the position of its front edge and the pulse width of the rear end pulse is changed by changing the position of its rear edge. Therefore, for example, high-density recording and high-speed random access are enabled.

Further, according to the data recording apparatus of the invention, recording pulses corresponding to a mark having a length nT are represented by a formula xS+(1.5−x)M+(n−2)(0.5S+0.5M)+yM+(0.5−y)S or xS+(1.5−x)M+(n−3)(0.5S+0.5M)+0.5S+yM+(1.0−y)S, and recording is performed by using the above recording pulses. Therefore, for example, recording compensation can easily be performed in accordance with the linear velocity or the like.

What is claimed is:

1. A data recording apparatus in which recording means records data onto a recording medium by forming a mark and a space thereon by using recording pulses that are a combination of a front end pulse, burst pulses, and a rear end pulse in a state that a relative velocity between the recording means and the recording medium is varied, the data recording apparatus comprising:

front end pulse generating means for generating a front end pulse having a pulse width of one clock as a front end of the data;

rear end pulse generating means for generating a rear end pulse having a pulse width of one clock as a rear end of the data;

first delaying means for delaying the data by a first delay x;

second delaying means for delaying the data by a second delay y; and recording pulses composing means for composing the recording pulses by performing an operation on outputs of the front end pulse generating means, the rear end pulse generating means, and the first and second delaying means, and wherein the first delay x and the second delay y are in a range of 0T to 0.5T.

2. A data recording apparatus in which recording means records data onto a recording medium by forming a mark and a space thereon by using recording pulses that are a combination of a front end pulse, burst pulses, and a rear end pulse in a state that a relative velocity between the recording means and the recording medium is varied, the data recording apparatus comprising:

front end pulse generating means for generating a front end pulse having a pulse width of one clock as a front end of the data;

rear end pulse generating means for generating a rear end pulse having a pulse width of one clock as a rear end of the data;

first delaying means for delaying the data by a first delay x;

second delaying means for delaying the data by a second delay y; and recording pulses composing means for composing the recording pulses by performing an operation on outputs of the front end pulse generating means, the rear end pulse generating means, and the first and second delaying means, and wherein the recording pulses composing means comprises:

first calculating means for calculating a logical sum of a clock signal and the outputs of the front end pulse generating means and the rear end pulse generating means;

second calculating means for calculating a logical product of the outputs of the first and second delaying means; and third calculating means for calculating a logical product of the outputs of the first and second calculating means.

3. A data recording apparatus in which recording means records data onto a recording medium by forming a mark and a space thereon by using recording pulses that are a combination of a front end pulse, burst pulses, and a rear end pulse in a state that a relative velocity between the recording means and the recording medium is varied, the data recording apparatus comprising:

front end pulse changing means for changing a pulse width of the front end pulse by changing a position of a front edge of the front end pulse; and rear end pulse changing means for changing a pulse width of the rear end pulse by changing a position of a rear edge of the rear end pulse wherein the front end pulse changing means and/or the rear end pulse changing means change the position of the front edge and/or the position of the rear edge, respectively, in accordance with a length of the mark or the space, and wherein the front end pulse changing means and/or the rear end pulse changing means change the pulse widths of the front end pulse and/or the rear end pulse, respectively, in a range of 0.5T to 1.5T, where T is a pulse width corresponding to a clock used in recording the data.

4. A data recording apparatus in which recording means records data onto a recording medium by forming a mark and a space thereon by using recording pulses that are a combination of a front end pulse, burst pulses, and a rear end pulse in a state that a relative velocity between the recording means and the recording medium is varied, the data recording apparatus comprising:

front end pulse changing means for changing a pulse width of the front end pulse by changing a position of a front edge of the front end pulse; and rear end pulse changing means for changing a pulse width of the rear end pulse by changing a position of a rear edge of the rear end pulse, wherein the front end pulse changing means and/or the rear end pulse changing means chance the position of the front edge of the front end pulse and/or the position of the rear edge of the rear end pulse, respectively, in accordance with a variation of the relative velocity between the recording means and the recording medium, and wherein the front end pulse changing means and/or the rear end pulse changing means change the pulse widths of the front end pulse and/or the rear end pulse, respectively, in a range of 0.5T to 1.5T, where T is a pulse width corresponding to a clock used in recording the data.

5. A data recording method in which recording means records data onto a recording medium by forming a mark and a space thereon by using recording pulses that are a combination of a front end pulse, burst pulses, and a rear end pulse in a state that a relative velocity between the recording means and the recording medium is varied, the data recording method comprising the steps of:

combining a front end pulse, burst pulses, and rear end pulse;

delaying a position of a front edge of the front end pulse and a position of a rear edge of the rear end pulse; and forming the mark and the space on the recording medium by using pulse-width-changed recording pulses, wherein the recording pulses corresponding to a mark having a length nT, where n is an integer and T is a pulse width corresponding to one clock, are represented by $x$S+(1.5−$x$)M+($n$−2)(0.5S+0.5M)+$y$M+(0.5−$y$)S, or $x$S+(1.5−$x$)M+($n$−3)(0.5S+0.5M)+0.5S+$y$M+(1.0−$y$)S where M represents one of a high-level portion having a length T and a low-level portion having a length T, S reperesents the other portions, x and y are delays in seconds.

6. A recording medium on which data are recorded such that recording means forms a mark and a space thereon by using recording pulses that are a combination of a front end pulse, burst pulses, and a rear end pulse in a state that a relatively velocity between the recording means and the recording medium is varied, wherein the mark is formed by using a front end pulse having a pulse width that is changed by changing a position of a front edge and a rear end pulse having a pulse width that is changed by changing a position of a rear edge, and wherein recording pulses corresponding to a mark having a length nT, where n is an integer and T is a pulse width corresponding to one clock, are represented by $x$S+(1.5−$x$)M+($n$−2)(0.5S+0.5M)+$y$M+(0.5−$y$)S, or $x$S+(1.5−$x$)M+($n$−3)(0.5S+0.5M)+0.5S+$y$M+(1.0−$y$)S where M represents one of a high-level portion having a length T and a low-level portion having a length T, S represents the other portions, x and y are delays in second.

7. A data recording apparatus in which recording means records data onto a recording medium by forming a mark and a space thereon by using recording pulses that are a combination of a front end pulse, burst pulses, and a rear end pulse in a state that a relative velocity between the recording means and the recording medium is varied, the data recording apparatus comprising:

front end pulse generating means for generating a front end pulse having a pulse width of one clock as a front end of the data;

rear end pulse generating means for generating a rear end pulse having a pulse width of one clock as a rear end of the data;

first delaying means for delaying the data by a first delay x;

second delaying means for delaying the data by a second delay y; and recording pulses composing means for composing the recording pulses by performing an operation on outputs of the front end pulse generating means, the rear end pulse generating means, and the first and second delaying means, and wherein recording pulses corresponding to a mark having a length nT, where n is an integer and T is a pulse width corresponding to one clock, are represented by $x$S+(1.5−$x$)M+($n$−2)(0.5S+0.5M)+$y$M+(0.5−$y$)S, or $x$S+(1.5−$x$)M+($n$−3)(0.5S+0.5M)+0.5S+$y$M+(1.0−$y$)S where M represents one of a high-level portion having a length T and a low-level portion having a length T, S represents the other portions, x and y are delays in second.

8. The data recording apparatus according to claim 7, wherein the front end pulse generating means, the rear end pulse generating means, the first and second delaying means, and the recording pulse composing means are implemented as a one-chip IC.

9. The data recording apparatus according to claim 7, wherein when the second delaying means delays the data that advances by a half clock or one clock, the recording pulses corresponding to the mark having the length nT are represented by $x$S+(1.5−$x$)M+($n$−2)(0.5S+0.5M)+$y$M+(0.5−$y$)S, or $x$S+(1.5−$x$)M+($n$−3)(0.5S+0.5M)+0.5S+$y$M+(1.0−$y$)S.

10. The data recording apparatus according to claim 7, wherein each of the first and second delaying means includes inverters.

11. The data recording apparatus according to claim 10, further comprising measuring means for measuring the number of stages of the inverters necessary for providing a given delay.

12. A data recording apparatus in which recording means records data onto a recording medium by forming a mark and a space thereon by using recording pulses that are a combination of a front end pulse, burst pulses, and a rear end pulse in a state that a relative velocity between the recording means and the recording medium is varied, the data recording apparatus comprising:

front end pulse generating means for generating a front end pulse having a pulse width of one clock as a front end of the data;

rear end pulse generating means for generating a rear end pulse having a pulse width of one clock as a rear end of the data;

first delaying means for delaying the data by a first delay x;

second delaying means for delaying the data by a second delay y;

recording pulses composing means for composing the recording pulses by performing an operation on outputs of the front end pulse generating means, the rear end pulse generating means, and the first and second delaying means; and delays setting means for setting the first delay x and the second delay y adaptively.

13. The data recording apparatus according to claim 12, wherein the delays setting means sets the first delay x and the second delay y based on the relative velocity between the recording means and the recording medium.

14. The data recording apparatus according to claim 12, wherein the delays setting means sets the first delay x and the second delay y based on the data.

* * * * *